(12) United States Patent
Jones et al.

(10) Patent No.: US 9,417,881 B2
(45) Date of Patent: Aug. 16, 2016

(54) PARALLEL DYNAMIC MEMORY ALLOCATION USING A LOCK-FREE POP-ONLY FIFO

(75) Inventors: Stephen Jones, San Francisco, CA (US); Xiaohuang Huang, Hangzhou (CN)

(73) Assignee: NVIDIA CORPORATION, Santa Clara, CA (US)

( * ) Notice: Subject to any disclaimer, the term of this patent is extended or adjusted under 35 U.S.C. 154(b) by 519 days.

(21) Appl. No.: 13/361,802

(22) Filed: Jan. 30, 2012

(65) Prior Publication Data

US 2013/0198479 A1 Aug. 1, 2013

(51) Int. Cl.
*G06F 12/02* (2006.01)
*G06F 9/38* (2006.01)
*G06F 9/50* (2006.01)

(52) U.S. Cl.
CPC ............ *G06F 9/3851* (2013.01); *G06F 9/3887* (2013.01); *G06F 9/5016* (2013.01); *G06F 12/0223* (2013.01)

(58) Field of Classification Search
None
See application file for complete search history.

(56) References Cited

U.S. PATENT DOCUMENTS

| 5,652,864 | A * | 7/1997 | Hine | 711/171 |
|---|---|---|---|---|
| 6,539,464 | B1 * | 3/2003 | Getov | 711/170 |
| 7,035,989 | B1 * | 4/2006 | Hinker et al. | 711/171 |
| 7,389,291 | B1 * | 6/2008 | Shavit et al. | |
| 2002/0099921 | A1 * | 7/2002 | Bonola | 711/170 |
| 2003/0121030 | A1 * | 6/2003 | Koob et al. | 717/152 |
| 2004/0015510 | A1 | 1/2004 | Moir et al. | |
| 2004/0098723 | A1 * | 5/2004 | Radovic et al. | 718/104 |
| 2005/0066082 | A1 * | 3/2005 | Forin et al. | 710/52 |
| 2005/0216691 | A1 | 9/2005 | Michael | |
| 2006/0005191 | A1 | 1/2006 | Boehm | |
| 2006/0031643 | A1 | 2/2006 | Figueira | |
| 2006/0123156 | A1 | 6/2006 | Moir et al. | |
| 2006/0190697 | A1 * | 8/2006 | Grant | 711/170 |
| 2007/0079071 | A1 * | 4/2007 | Saha et al. | 711/118 |
| 2007/0130567 | A1 * | 6/2007 | Van Der Veen | 718/102 |
| 2007/0169123 | A1 | 7/2007 | Hopkins | |
| 2008/0162863 | A1 * | 7/2008 | McClure et al. | 711/171 |
| 2009/0077083 | A1 * | 3/2009 | Magruder et al. | 707/8 |
| 2009/0204755 | A1 | 8/2009 | Rushworth et al. | |
| 2010/0150329 | A1 * | 6/2010 | Kumar et al. | 379/201.12 |
| 2013/0061009 | A1 * | 3/2013 | Kumar et al. | 711/154 |

OTHER PUBLICATIONS

Ladan-Mozes et al. ("An Optimistic Approach to Lock-Free Queues"): DISC 2004, LNCS 3274, pp. 117-131.*
John D. Valois (Implementing Lock-Free queues), Oct. 1994, pp. 1-9.*

(Continued)

*Primary Examiner* — Kaushikkumar Patel
(74) *Attorney, Agent, or Firm* — Artegis Law Group, LLP

(57) ABSTRACT

One embodiment of the present invention sets forth a technique for dynamically allocating memory using one or more lock-free pop-only FIFOs. One or more lock-free FIFOs are populated with FIFO nodes, where each FIFO node represents a memory allocation of a predetermined size. Each particular lock-free FIFO includes memory allocations of a single size. Different lock-free FIFOs may include memory allocations for different sizes to service allocation requests for different size memory allocations. A lock-free mechanism is used to pop FIFO nodes from the FIFO. The use of the lock-free FIFO allows multiple consumers to simultaneously attempt to pop the head FIFO node without first obtaining a lock to ensure exclusive access of the FIFO.

28 Claims, 13 Drawing Sheets

(56) References Cited

OTHER PUBLICATIONS

A. Gidenstam et al. (NBMALLOC: Allocating Memory in Lock-Free Manner), Jan. 22, 2009, pp. 1-35.*
Maged M. Michael (Scalable Lock-Free Dynamic Memory Allocation); 2004 ACM 1-58113-807-5/04/0006 pp. 1-12.*
Johnstone et al. (The Memory Fragmentation Problem: Solved? pp. 26-36, published in 1998).*
Chung et al. (Memory Allocation with Lazy Fits: published in 2000; pp. 65-70).*
Non-Final Office Action dated Aug. 1, 2013, U.S. Appl. No. 13/361,781, 8 pages.
Final Office Action dated Apr. 14, 2015, having U.S. Appl. No. 13/361,816.
Non-Final Office Action dated Mar. 26, 2015, having U.S. Appl. No. 13/361,781.

* cited by examiner

PARALLEL DYNAMIC MEMORY ALLOCATION USING A LOCK-FREE POP-ONLY FIFO

BACKGROUND OF THE INVENTION

1. Field of the Invention

The present invention generally relates to memory allocation and more specifically to memory allocation using a lock-free pop-only first-in first-out buffer (FIFO).

2. Description of the Related Art

The standard C library provides the malloc( ) command, which allocates blocks of memory dynamically from a heap ("the heap" is the term used for the pool of memory available for allocation). Memory blocks may be of any size, and may be allocated and freed repeatedly and in any order. Multiple calls to malloc( ) are guaranteed not to return overlapping memory regions—the memory is "owned" exclusively by the requestor until it is explicitly released through the free( ) command.

The standard C library provides the malloc( ) command, which allocates blocks of memory dynamically from a heap ("the heap" is the term used for the pool of memory available for allocation). Memory blocks may be of any size, and may be allocated and freed repeatedly and in any order. Multiple calls to malloc( ) are guaranteed not to return overlapping memory regions—the memory is "owned" exclusively by the requestor until it is explicitly released through the free( ) command.

Memory allocation poses a problem in parallel programming because of contention arising between multiple consumers (the executing threads) of a single resource (the heap). If two threads access the heap simultaneously and independently, it is possible that both will claim the same region of memory. As the memory region returned by malloc( ) is owned exclusively by the requestor, two threads acquiring the same region would be an error.

A solution of restricting heap access to one thread at a time via a lock results in serialisation of the requests and hence the poorest possible performance. The problem therefore, is to somehow access the heap in a manner which permits parallel execution yet still ensures safe allocation.

Accordingly, what is needed in the art is an improved system and method for allocating memory from a heap for multiple parallel threads so that each thread acquires a separate portion of memory.

SUMMARY OF THE INVENTION

One embodiment of the present invention sets forth a technique for parallel dynamic allocation of memory using a lock-free FIFO. One or more lock-free FIFOs are populated with FIFO nodes, where each FIFO node represents a memory allocation of a predetermined size. Each particular lock-free FIFO includes memory allocations of a single size. Different lock-free FIFOs may include memory allocations for different sizes to service allocation requests for different size memory allocations. A lock-free mechanism is used to pop FIFO nodes from the FIFO. The use of the lock-free FIFO allows multiple consumers to simultaneously attempt to pop the head FIFO node without first obtaining a lock to ensure exclusive access of the FIFO.

Various embodiments of a method of the invention for allocating memory includes receiving a first memory allocation request specifying a first amount of memory and receiving a second memory allocation request simultaneously with the first memory allocation request, where the second memory allocation request specifies the first amount of memory. A first-in first-out buffer (FIFO) node size based on the first amount of memory is identified. A first FIFO and a second FIFO that are each populated with FIFO nodes of the FIFO node size are selected. A first FIFO head node is popped from the first FIFO to satisfy the first memory allocation request. Simultaneously with the popping of the first FIFO head node, a second FIFO head node is popped from the second FIFO to satisfy the second memory allocation request.

A "lock-free" mechanism allows multiple consumers to access a FIFO. When two or more consumers attempt to pop a FIFO node from the lock-free FIFO simultaneously, only one of the consumers succeeds. However, each consumer is provided with an indication of whether their pop, i.e., memory allocation request; was successful. Unsuccessful memory allocation requests may be retried in the following clock cycle, so that simultaneous memory access requests are serialized. When FIFO nodes are not available to satisfy a memory allocation request, one or more additional lock-free FIFOs may be generated and populated with FIFO nodes.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
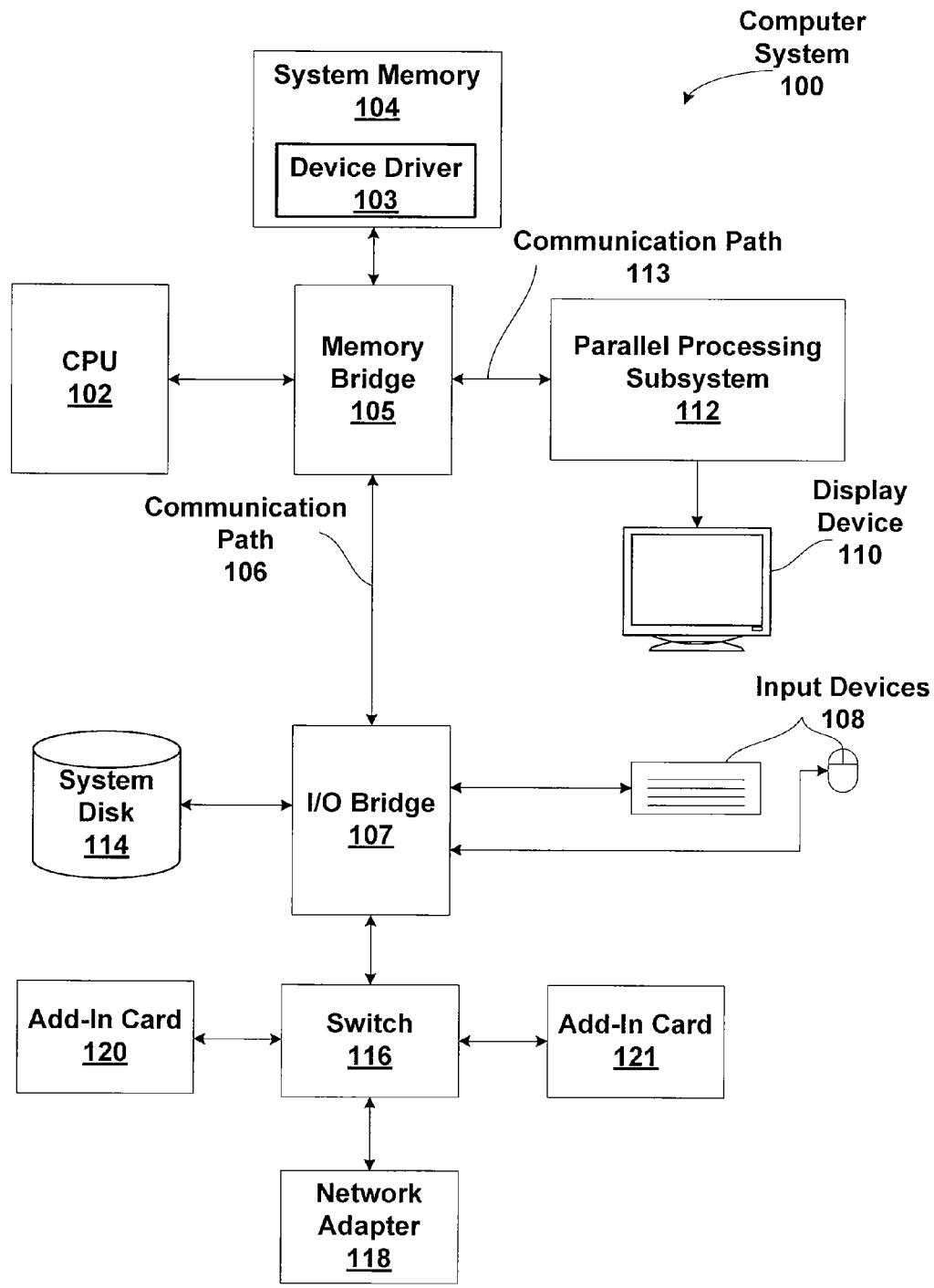
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via communication path 106 and memory bridge 105. A parallel processing subsystem 112 is coupled to memory bridge 105 via a bus or second communication path 113 (e.g., a Peripheral Component Interconnect (PCI) Express, Accelerated Graphics Port, or HyperTransport link); in one embodiment parallel processing subsystem 112 is a graphics subsystem that delivers pixels to a display device 110 (e.g., a conventional cathode ray tube or liquid crystal display based monitor). A system disk 114 is also connected to I/O bridge 107. A switch 116 provides connections between I/O bridge 107 and other components such as a network adapter 118 and various add-in cards 120 and 121. Other components (not explicitly shown), including universal serial bus (USB) or other port connections, compact disc (CD) drives, digital video disc (DVD) drives, film recording devices, and the like, may also be connected to I/O bridge 107. The various communication paths shown in FIG. 1, including the specifically named communication paths 106 and 113 may be implemented using any suitable protocols, such as PCI Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements in a single subsystem, such as joining the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip instead of existing as one or more discrete devices. Large embodiments may include two or more CPUs 102 and two or more parallel processing subsystems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
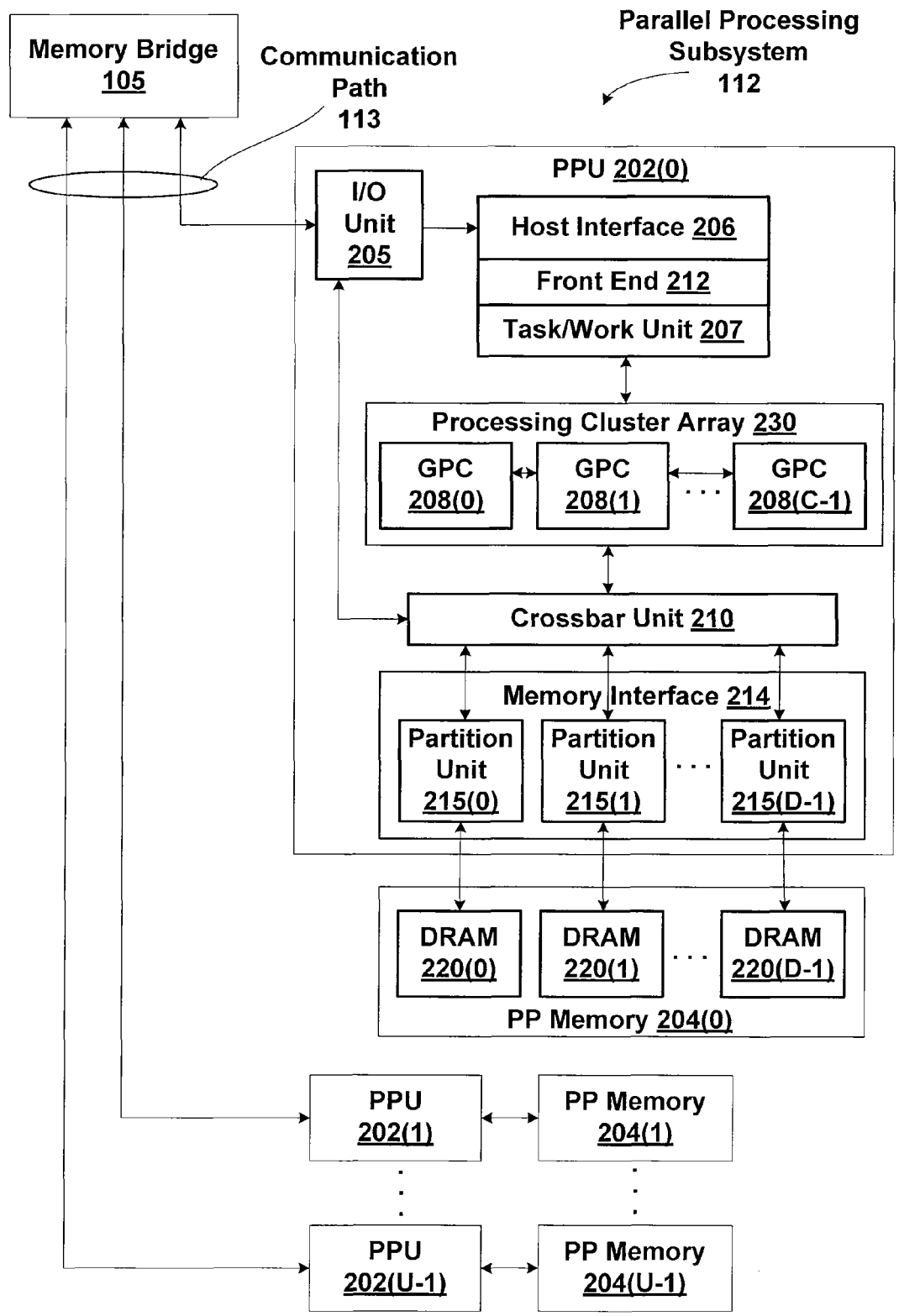
FIG. 2 is a block diagram of a parallel processing subsystem for the computer system of FIG. 1, according to one embodiment of the present invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where U≥1. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1 as well as FIG. 2, in some embodiments, some or all of PPUs 202 in parallel processing subsystem 112 are graphics processors with rendering pipelines that can be configured to perform various operations related to generating pixel data from graphics data supplied by CPU 102 and/or system memory 104 via memory bridge 105 and the second communication path 113, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have a dedicated parallel processing memory device(s) or no dedicated parallel processing memory device(s). One or more PPUs 202 in parallel processing subsystem 112 may output data to display device 110 or each PPU 202 in parallel processing subsystem 112 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a data structure (not explicitly shown in either FIG. 1 or FIG. 2) that may be located in system memory 104, parallel processing memory 204, or another storage location accessible to both CPU 102 and PPU 202. A pointer to each data structure is written to a pushbuffer to initiate processing of the stream of commands in the data structure. The PPU 202 reads command streams from one or more pushbuffers and then executes commands asynchronously relative to the operation of CPU 102. Execution priorities may be specified for each pushbuffer by an application program via the device driver 103 to control scheduling of the different pushbuffers.

Referring back now to FIG. 2 as well as FIG. 1, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI Express link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each pushbuffer and outputs the command stream stored in the pushbuffer to a front end 212.

Each PPU 202 advantageously implements a highly parallel processing architecture. As shown in detail, PPU 202(0) includes a processing cluster array 230 that includes a number C of general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary dependent on the workload arising for each type of program or computation.

GPCs 208 receive processing tasks to be executed from a work distribution unit within a task/work unit 207. The work distribution unit receives pointers to processing tasks that are encoded as task metadata (TMD) and stored in memory. The pointers to TMDs are included in the command stream that is stored as a pushbuffer and received by the front end unit 212 from the host interface 206. Processing tasks that may be encoded as TMDs include indices of data to be processed, as well as state parameters and commands defining how the data is to be processed (e.g., what program is to be executed). The task/work unit 207 receives tasks from the front end 212 and ensures that GPCs 208 are configured to a valid state before the processing specified by each one of the TMDs is initiated. A priority may be specified for each TMD that is used to schedule execution of the processing task. Processing tasks can also be received from the processing cluster array 230. Optionally, the TMD can include a parameter that controls whether the TMD is added to the head or the tail for a list of processing tasks (or list of pointers to the processing tasks), thereby providing another level of control over priority.

Memory interface 214 includes a number D of partition units 215 that are each directly coupled to a portion of parallel processing memory 204, where D≥1. As shown, the number of partition units 215 generally equals the number of dynamic random access memory (DRAM) 220. In other embodiments, the number of partition units 215 may not equal the number of memory devices. Persons of ordinary skill in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the DRAMs 220 within parallel processing memory 204. Crossbar unit 210 is configured to route the output of each GPC 208 to the input of any partition unit 215 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. In the embodiment shown in FIG. 2, crossbar unit 210 is directly connected with I/O unit 205. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI Express) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Multiple Concurrent Task Scheduling

Multiple processing tasks may be executed concurrently on the GPCs 208 and a processing task may generate one or more "child" processing tasks during execution. The task/work unit 207 receives the tasks and dynamically schedules the processing tasks and child processing tasks for execution by the GPCs 208.

Figure 3A:
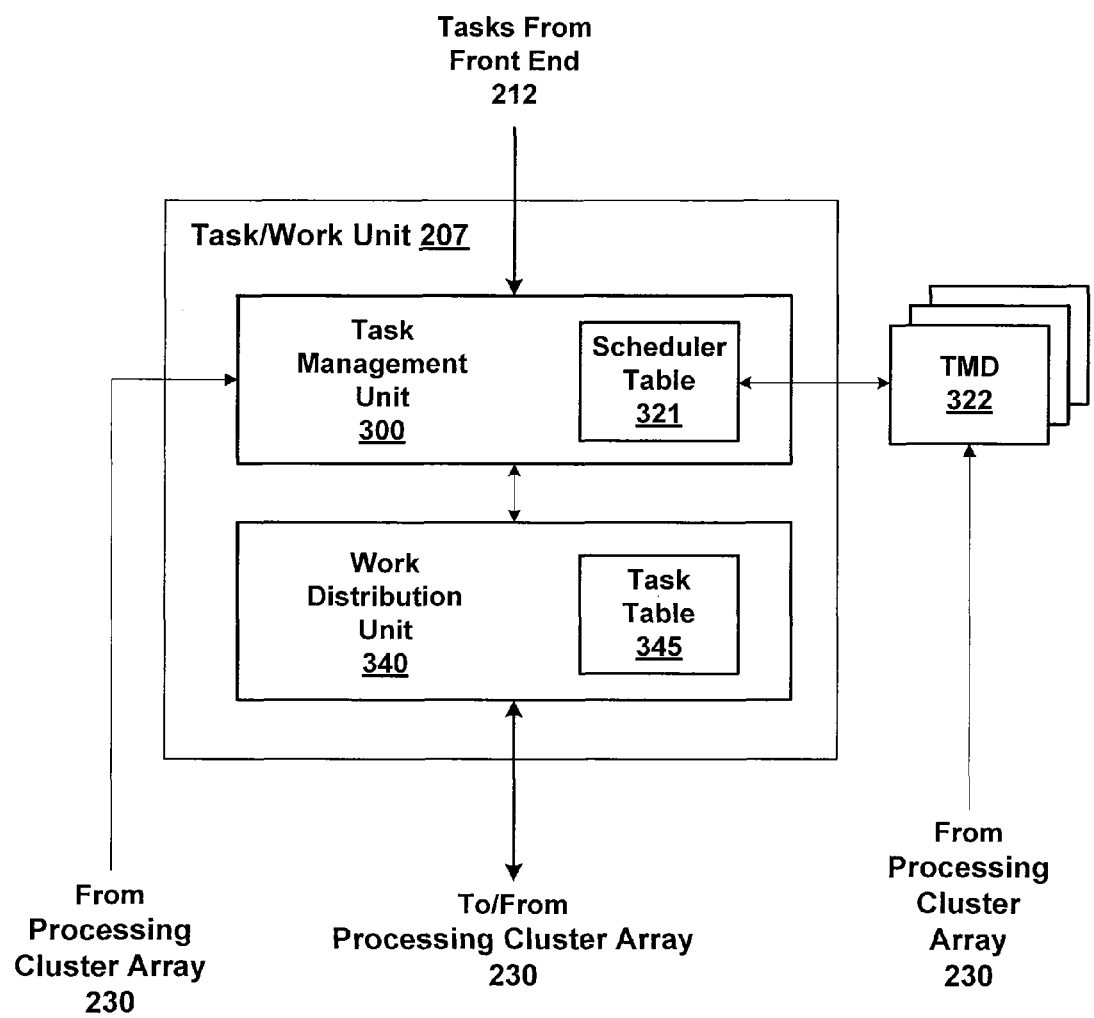
FIG. 3A is a block diagram of a GPC within one of the PPUs of FIG. 2, according to one embodiment of the present invention.

FIG. 3A is a block diagram of the task/work unit 207 of FIG. 2, according to one embodiment of the present invention. The task/work unit 207 includes a task management unit 300 and the work distribution unit 340. The task management unit 300 organizes tasks to be scheduled based on execution priority levels. For each priority level, the task management unit 300 stores a list of pointers to the TMDs 322 corresponding to the tasks in the scheduler table 321, where the list may be implemented as a linked list. The TMDs 322 may be stored in the PP memory 204 or system memory 104. The rate at which the task management unit 300 accepts tasks and stores the tasks in the scheduler table 321 is decoupled from the rate at which the task management unit 300 schedules tasks for execution. Therefore, the task management unit 300 may collect several tasks before scheduling the tasks. The collected tasks may then be scheduled, based on priority information or using other techniques, such as round-robin scheduling.

The work distribution unit 340 includes a task table 345 with slots that may each be occupied by the TMD 322 for a task that is being executed. The task management unit 300 may schedule tasks for execution when there is a free slot in the task table 345. When there is not a free slot, a higher priority task that does not occupy a slot may evict a lower priority task that does occupy a slot. When a task is evicted, the task is stopped, and if execution of the task is not complete, then a pointer to the task is added to a list of task pointers to be scheduled so that execution of the task will resume at a later time. When a child processing task is generated, during execution of a task, a pointer to the child task is added to the list of task pointers to be scheduled. A child task may be generated by a TMD 322 executing in the processing cluster array 230.

Unlike a task that is received by the task/work unit 207 from the front end 212, child tasks are received from the processing cluster array 230. Child tasks are not inserted into pushbuffers or transmitted to the front end. The CPU 102 is not notified when a child task is generated or data for the child task is stored in memory. Another difference between the tasks that are provided through pushbuffers and child tasks is that the tasks provided through the pushbuffers are defined by the application program whereas the child tasks are dynamically generated during execution of the tasks.

Task Processing Overview

Figure 3B:
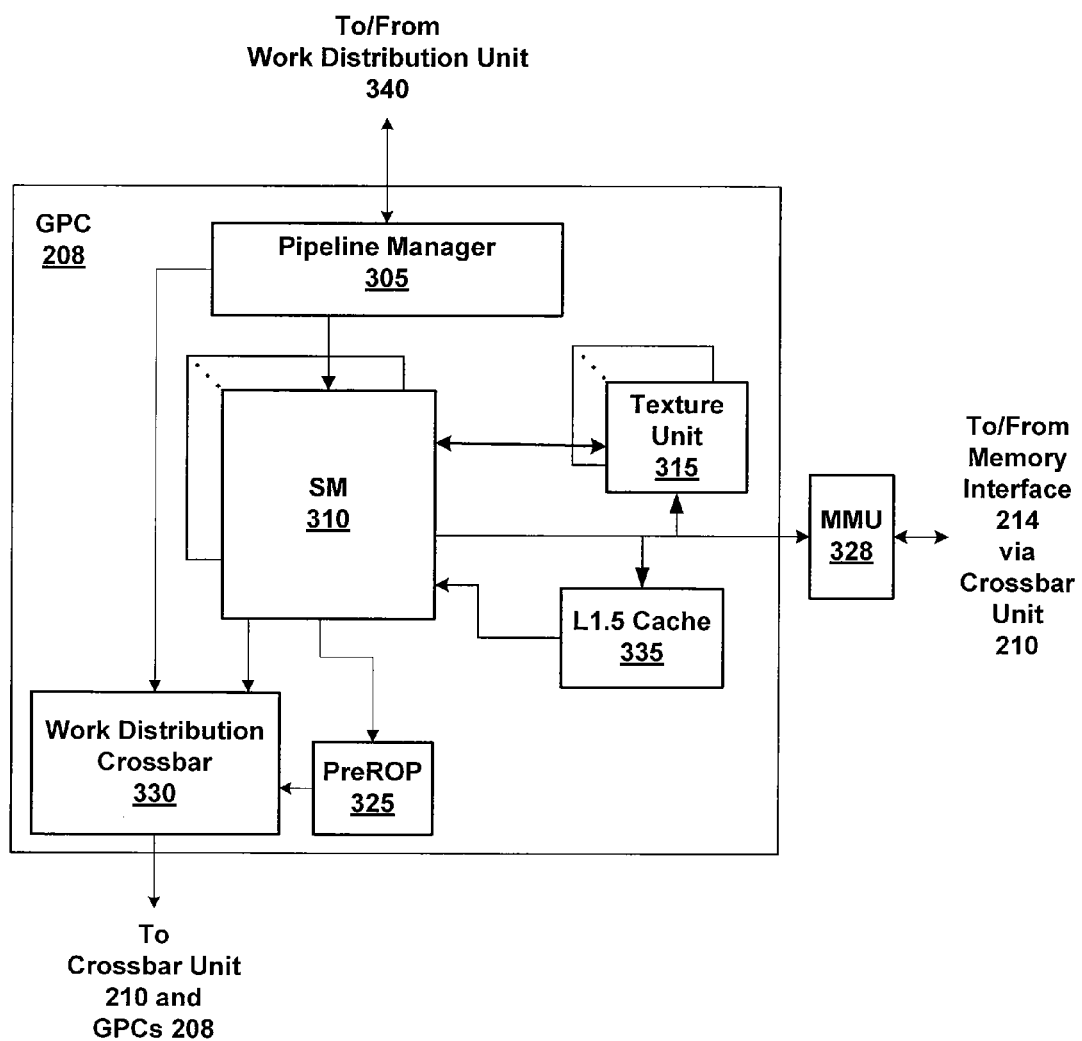
FIG. 3B is a block diagram of a partition unit within one of the PPUs of FIG. 2, according to one embodiment of the present invention.

FIG. 3B is a block diagram of a GPC 208 within one of the PPUs 202 of FIG. 2, according to one embodiment of the present invention. Each GPC 208 may be configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons of ordinary skill in the art will understand that a SIMD processing regime represents a functional subset of a SIMT processing regime.

Operation of GPC 208 is advantageously controlled via a pipeline manager 305 that distributes processing tasks to streaming multiprocessors (SMs) 310. Pipeline manager 305 may also be configured to control a work distribution crossbar 330 by specifying destinations for processed data output by SMs 310.

In one embodiment, each GPC 208 includes a number M of SMs 310, where M≥1, each SM 310 configured to process one or more thread groups. Also, each SM 310 advantageously includes an identical set of functional execution units (e.g., execution units and load-store units—shown as Exec units 302 and LSUs 303 in FIG. 3C) that may be pipelined, allowing a new instruction to be issued before a previous instruction has finished, as is known in the art. Any combination of functional execution units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional unit hardware can be leveraged to perform different operations.

The series of instructions transmitted to a particular GPC 208 constitutes a thread, as previously defined herein, and the collection of a certain number of concurrently executing threads across the parallel processing engines (not shown) within an SM 310 is referred to herein as a "warp" or "thread group." As used herein, a "thread group" refers to a group of threads concurrently executing the same program on different input data, with one thread of the group being assigned to a different processing engine within an SM 310. A thread group may include fewer threads than the number of processing engines within the SM 310, in which case some processing engines will be idle during cycles when that thread group is being processed. A thread group may also include more threads than the number of processing engines within the SM 310, in which case processing will take place over consecutive clock cycles. Since each SM 310 can support up to G thread groups concurrently, it follows that up to G*M thread groups can be executing in GPC 208 at any given time.

Additionally, a plurality of related thread groups may be active (in different phases of execution) at the same time within an SM 310. This collection of thread groups is referred to herein as a "cooperative thread array" ("CTA") or "thread array." The size of a particular CTA is equal to m*k, where k is the number of concurrently executing threads in a thread group and is typically an integer multiple of the number of parallel processing engines within the SM 310, and m is the number of thread groups simultaneously active within the SM 310. The size of a CTA is generally determined by the programmer and the amount of hardware resources, such as memory or registers, available to the CTA.

Each SM 310 contains a level one (L1) cache (shown in FIG. 3C) or uses space in a corresponding L1 cache outside of the SM 310 that is used to perform load and store operations. Each SM 310 also has access to level two (L2) caches that are shared among all GPCs 208 and may be used to transfer data between threads. Finally, SMs 310 also have access to off-chip "global" memory, which can include, e.g., parallel processing memory 204 and/or system memory 104. It is to be understood that any memory external to PPU 202 may be used as global memory. Additionally, a level one-point-five (L1.5) cache 335 may be included within the GPC 208, configured to receive and hold data fetched from memory via memory interface 214 requested by SM 310, including instructions, uniform data, and constant data, and provide the requested data to SM 310. Embodiments having multiple SMs 310 in GPC 208 beneficially share common instructions and data cached in L1.5 cache 335.

Each GPC 208 may include a memory management unit (MMU) 328 that is configured to map virtual addresses into physical addresses. In other embodiments, MMU(s) 328 may reside within the memory interface 214. The MMU 328 includes a set of page table entries (PTEs) used to map a virtual address to a physical address of a tile and optionally a cache line index. The MMU 328 may include address translation lookaside buffers (TLB) or caches which may reside within multiprocessor SM 310 or the L1 cache or GPC 208. The physical address is processed to distribute surface data access locality to allow efficient request interleaving among partition units 215. The cache line index may be used to determine whether or not a request for a cache line is a hit or miss.

In graphics and computing applications, a GPC 208 may be configured such that each SM 310 is coupled to a texture unit 315 for performing texture mapping operations, e.g., determining texture sample positions, reading texture data, and filtering the texture data. Texture data is read from an internal texture L1 cache (not shown) or in some embodiments from the L1 cache within SM 310 and is fetched from an L2 cache that is shared between all GPCs 208, parallel processing memory 204, or system memory 104, as needed. Each SM 310 outputs processed tasks to work distribution crossbar 330 in order to provide the processed task to another GPC 208 for further processing or to store the processed task in an L2 cache, parallel processing memory 204, or system memory 104 via crossbar unit 210. A preROP (pre-raster operations) 325 is configured to receive data from SM 310, direct data to ROP units within partition units 215, and perform optimizations for color blending, organize pixel color data, and perform address translations.

It will be appreciated that the core architecture described herein is illustrative and that variations and modifications are possible. Any number of processing units, e.g., SMs 310 or texture units 315, preROPs 325 may be included within a GPC 208. Further, as shown in FIG. 2, a PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing units, L1 caches to execute tasks for one or more application programs.

Persons of ordinary skill in the art will understand that the architecture described in FIGS. 1, 2, 3A, and 3B in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

In embodiments of the present invention, it is desirable to use PPU 202 or other processor(s) of a computing system to execute general-purpose computations using thread arrays. Each thread in the thread array is assigned a unique thread identifier ("thread ID") that is accessible to the thread during the thread's execution. The thread ID, which can be defined as a one-dimensional or multi-dimensional numerical value controls various aspects of the thread's processing behavior. For instance, a thread ID may be used to determine which portion of the input data set a thread is to process and/or to determine which portion of an output data set a thread is to produce or write.

A sequence of per-thread instructions may include at least one instruction that defines a cooperative behavior between the representative thread and one or more other threads of the thread array. For example, the sequence of per-thread instructions might include an instruction to suspend execution of operations for the representative thread at a particular point in the sequence until such time as one or more of the other threads reach that particular point, an instruction for the representative thread to store data in a shared memory to which one or more of the other threads have access, an instruction for the representative thread to atomically read and update data stored in a shared memory to which one or more of the other threads have access based on their thread IDs, or the like. The CTA program can also include an instruction to compute an address in the shared memory from which data is to be read, with the address being a function of thread ID. By defining suitable functions and providing synchronization techniques, data can be written to a given location in shared memory by one thread of a CTA and read from that location by a different thread of the same CTA in a predictable manner. Consequently, any desired pattern of data sharing among threads can be supported, and any thread in a CTA can share data with any other thread in the same CTA. The extent, if any, of data sharing among threads of a CTA is determined by the CTA program; thus, it is to be understood that in a particular application that uses CTAs, the threads of a CTA might or might not actually share data with each other, depending on the CTA program, and the terms "CTA" and "thread array" are used synonymously herein.

Figure 3C:
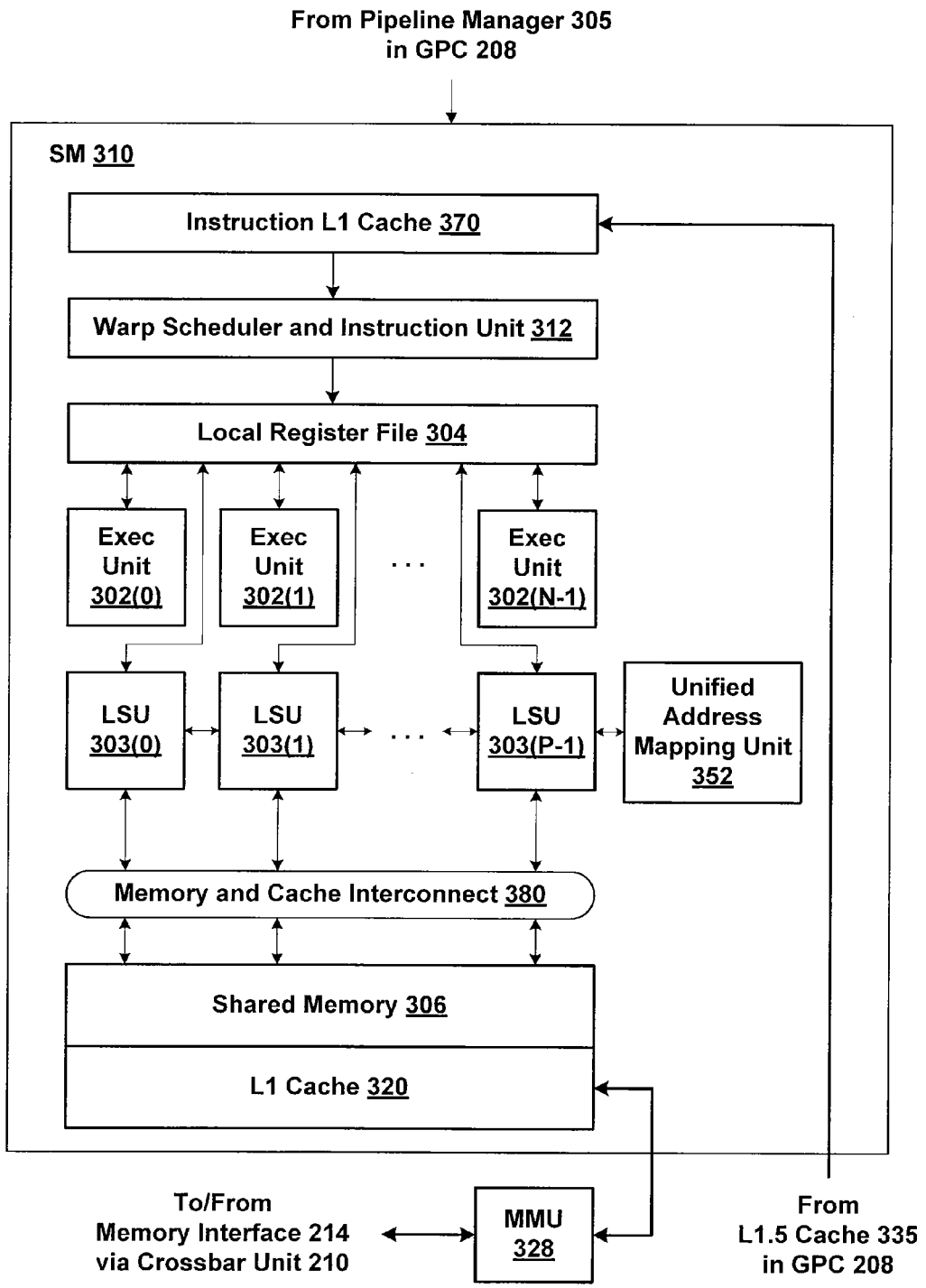
FIG. 3C is a block diagram of a portion of the SM of FIG. 3B, according to one embodiment of the present invention.

FIG. 3C is a block diagram of the SM 310 of FIG. 3B, according to one embodiment of the present invention. The SM 310 includes an instruction L1 cache 370 that is configured to receive instructions and constants from memory via L1.5 cache 335. A warp scheduler and instruction unit 312 receives instructions and constants from the instruction L1 cache 370 and controls local register file 304 and SM 310 functional units according to the instructions and constants. The SM 310 functional units include N exec (execution or processing) units 302 and P load-store units (LSU) 303.

SM 310 provides on-chip (internal) data storage with different levels of accessibility. Special registers (not shown) are readable but not writeable by LSU 303 and are used to store parameters defining each thread's "position." In one embodiment, special registers include one register per thread (or per exec unit 302 within SM 310) that stores a thread ID; each thread ID register is accessible only by a respective one of the exec unit 302. Special registers may also include additional registers, readable by all threads that execute the same processing task represented by a TMD 322 (or by all LSUs 303) that store a CTA identifier, the CTA dimensions, the dimensions of a grid to which the CTA belongs (or queue position if the TMD 322 encodes a queue task instead of a grid task), and an identifier of the TMD 322 to which the CTA is assigned.

If the TMD 322 is a grid TMD, execution of the TMD 322 causes a fixed number of CTAs to be launched and executed to process the fixed amount of data stored in the queue 525. The number of CTAs is specified as the product of the grid width, height, and depth. The fixed amount of data may be stored in the TMD 322 or the TMD 322 may store a pointer to the data that will be processed by the CTAs. The TMD 322 also stores a starting address of the program that is executed by the CTAs.

If the TMD 322 is a queue TMD, then a queue feature of the TMD 322 is used, meaning that the amount of data to be processed is not necessarily fixed. Queue entries store data for processing by the CTAs assigned to the TMD 322. The queue entries may also represent a child task that is generated by another TMD 322 during execution of a thread, thereby providing nested parallelism. Typically, execution of the thread, or CTA that includes the thread, is suspended until execution of the child task completes. The queue may be stored in the TMD 322 or separately from the TMD 322, in which case the TMD 322 stores a queue pointer to the queue. Advantageously, data generated by the child task may be written to the queue while the TMD 322 representing the child task is executing. The queue may be implemented as a circular queue so that the total amount of data is not limited to the size of the queue.

CTAs that belong to a grid have implicit grid width, height, and depth parameters indicating the position of the respective CTA within the grid. Special registers are written during initialization in response to commands received via front end 212 from device driver 103 and do not change during execution of a processing task. The front end 212 schedules each processing task for execution. Each CTA is associated with a specific TMD 322 for concurrent execution of one or more tasks. Additionally, a single GPC 208 may execute multiple tasks concurrently.

A parameter memory (not shown) stores runtime parameters (constants) that can be read but not written by any thread within the same CTA (or any LSU 303). In one embodiment, device driver 103 provides parameters to the parameter memory before directing SM 310 to begin execution of a task that uses these parameters. Any thread within any CTA (or any exec unit 302 within SM 310) can access global memory through a memory interface 214. Portions of global memory may be stored in the L1 cache 320.

Local register file 304 is used by each thread as scratch space; each register is allocated for the exclusive use of one thread, and data in any of local register file 304 is accessible only to the thread to which the register is allocated. Local register file 304 can be implemented as a register file that is physically or logically divided into P lanes, each having some number of entries (where each entry might store, e.g., a 32-bit word). One lane is assigned to each of the N exec units 302 and P load-store units LSU 303, and corresponding entries in different lanes can be populated with data for different threads executing the same program to facilitate SIMD execution. Different portions of the lanes can be allocated to different ones of the G concurrent thread groups, so that a given entry in the local register file 304 is accessible only to a particular thread. In one embodiment, certain entries within the local register file 304 are reserved for storing thread identifiers, implementing one of the special registers. Additionally, a uniform L1 cache 375 stores uniform or constant values for each lane of the N exec units 302 and P load-store units LSU 303.

Shared memory 306 is accessible to threads within a single CTA; in other words, any location in shared memory 306 is accessible to any thread within the same CTA (or to any processing engine within SM 310). Shared memory 306 can be implemented as a shared register file or shared on-chip cache memory with an interconnect that allows any processing engine to read from or write to any location in the shared memory. In other embodiments, shared state space might map onto a per-CTA region of off-chip memory, and be cached in L1 cache 320. The parameter memory can be implemented as a designated section within the same shared register file or shared cache memory that implements shared memory 306, or as a separate shared register file or on-chip cache memory to which the LSUs 303 have read-only access. In one embodiment, the area that implements the parameter memory is also used to store the CTA ID and task ID, as well as CTA and grid dimensions or queue position, implementing portions of the special registers. Each LSU 303 in SM 310 is coupled to a unified address mapping unit 352 that converts an address provided for load and store instructions that are specified in a unified memory space into an address in each distinct memory space. Consequently, an instruction may be used to access any of the local, shared, or global memory spaces by specifying an address in the unified memory space.

The L1 cache 320 in each SM 310 can be used to cache private per-thread local data and also per-application global data. In some embodiments, the per-CTA shared data may be cached in the L1 cache 320. The LSUs 303 are coupled to the shared memory 306 and the L1 cache 320 via a memory and cache interconnect 380.

Parallel Dynamic Memory Allocation

Memory is typically organized as a "heap" for allocation to one or more parallel threads. Conventionally, each thread is dynamically allocated a separate portion of the heap for use during processing. When the thread is finished using the portion of memory, the portion of the heap that was allocated to the thread is released. Lock-based algorithms perform poorly in a parallel system because of serialisation of access to the entire shared resource, e.g. memory and the overhead required for locking and unlocking access.

One embodiment of the present invention sets forth a technique for parallel dynamic allocation of memory using a lock-free FIFO. One or more lock-free FIFOs are populated with FIFO nodes, where each FIFO node represents a memory allocation of a predetermined size. The memory allocation of a single FIFO node should include contiguous locations in the memory heap 451. Each particular lock-free FIFO includes memory allocations of a single size that can be allocated to one or more threads. Different lock-free FIFOs may include memory allocations for different sizes to service allocation requests for different size memory allocations.

Figure 4A:
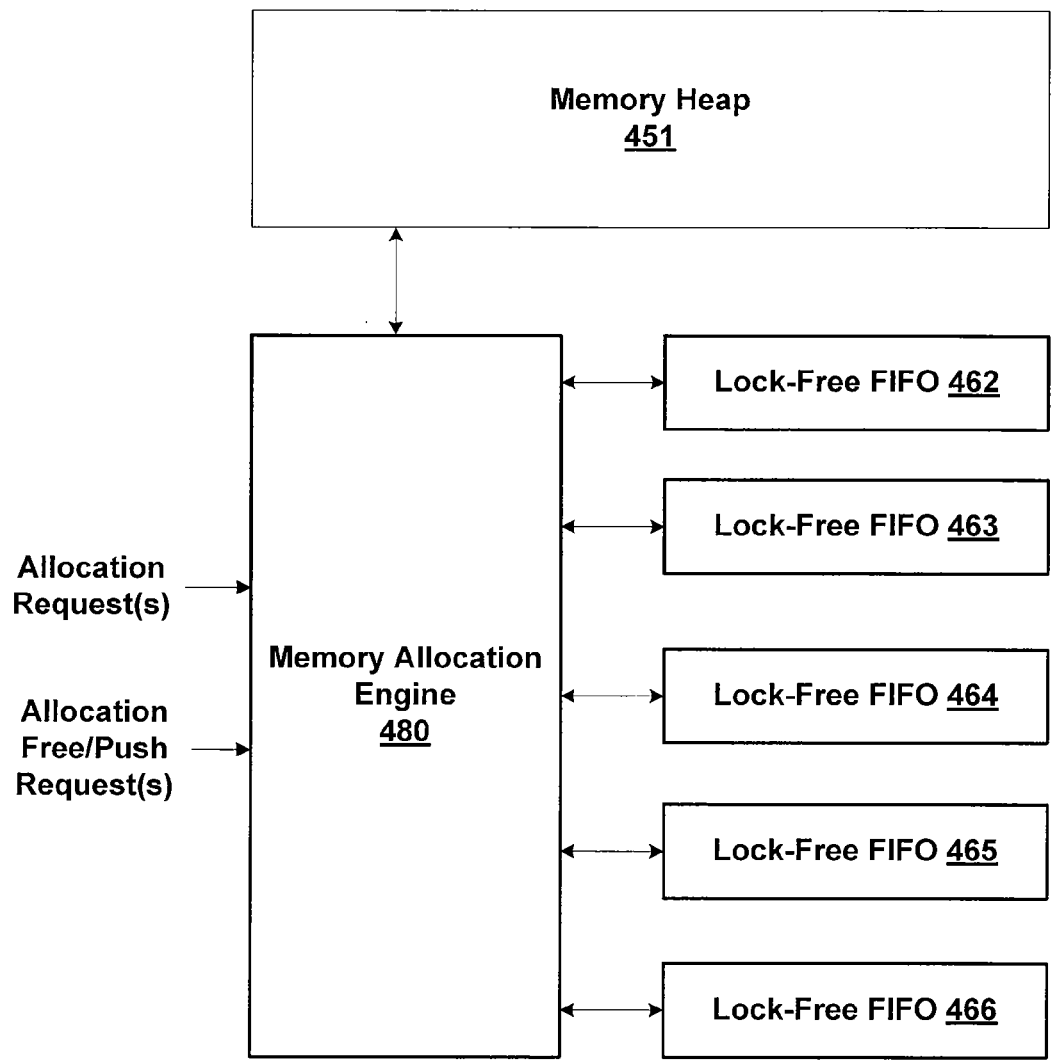
FIG. 4A is a conceptual diagram of a memory allocation engine configured to allocate memory using one or more lock-free FIFOs, according to one embodiment of the present invention.

FIG. 4A is a conceptual diagram of a memory allocation engine 480 configured to allocate memory from a memory heap 451 using one or more lock-free FIFOs 462 through 467, according to one embodiment of the present invention. The memory allocation engine 480 or separate engine is configured to create and populate one or more lock-free FIFOs 462, 463, 464, 465, and 466 with FIFO nodes. In one embodiment, the FIFO nodes that are allocated from the memory heap 451 for a particular lock-free FIFO correspond to a sequence of contiguous locations in the memory heap 451.

The memory allocation engine 480 may create and populate the different lock-free FIFOs based on allocation request parameters, such as the size of allocations that are requested, the frequency of allocation requests for the different allocation sizes, the latency incurred before an allocation request is satisfied, and the like. Conventional memory allocation techniques require a thread to first lock access to the memory heap and then receive an allocation of contiguous memory addresses that is found by searching a data structure. While one thread has the memory locked, other threads must wait. The creation and population of multiple lock-free FIFOs permits lock-free parallel access by multiple threads for the same or for different allocation sizes. Multiple threads may simultaneously be allocated a portion of memory or release a portion of the memory.

The memory allocation engine 480 receives allocation requests and allocation push/free requests from threads, and allocation and/or allocation push/free requests may be simultaneously received from multiple threads. The memory allocation engine 480 may be implemented in software that is executed by a processing engine or as dedicated circuitry such as a finite-state machine. A variety of different memory allocation sizes may be represented by the FIFO nodes in different lock-free FIFOs 462 through 466. However, two of more lock-free FIFOs may be configured with FIFO nodes representing the same particular size of memory allocations so that multiple allocations of the particular size may be satisfied simultaneously. Because the size of the memory allocations are fixed, allocation requests for sizes that are smaller than one of the fixed sizes will result in some "over-allocation" of the memory. Therefore, memory allocation engine 480 may be configured to combine allocation requests for threads within the same thread group into a single larger allocation request.

When the memory allocation engine 480 receives an allocation request the memory allocation engine 480 identifies the size of the allocation and selects a lock-free FIFO that is populated with FIFO nodes that are each large enough to satisfy the allocation request with a single FIFO node. The memory allocation engine 480 then outputs a pop request to the selected lock-free FIFO.

The FIFO head node is popped from the selected lock-free FIFO to satisfy the allocation request for a thread. When threads are finished using an allocation, each thread releases the respective allocated FIFO nodes by providing an allocation free/push request to the memory allocation engine 480. In one embodiment, released FIFO nodes are pushed back onto the lock-free FIFO from which each respective released FIFO node was originally popped. In another embodiment, released FIFO nodes are not pushed back onto the lock-free FIFOs and when all of the FIFO nodes that populated a particular lock-free FIFO are released, the lock-free FIFO is retired and the memory represented by the FIFO nodes for the particular lock-free FIFO is released back to the memory heap 451. The memory allocation engine 480 may configure each lock-free FIFO as either a pop-only FIFO that receives free requests (and does not receive push requests) or as a lock-free FIFO that receives push requests (and does not receive free requests). Information is maintained for each FIFO node so that each popped FIFO nodes are returned to the lock-free FIFO from which the respective FIFO node was popped.

As lock-free FIFOs are created and populated with FIFO nodes, the amount of memory available in the memory heap 451 decreases. As is also the case with conventional memory allocation techniques, over time, the memory heap 451 may become fragmented, causing difficulties for satisfying allocation requests for large portions of memory because the allocations require contiguous locations in memory. As needed, the memory heap 451 may be defragmented using conventional techniques. If needed for defragmentation, the memory allocation engine 480 may change the configuration of one or more lock-free FIFOs to be pop-only FIFOs and when all of the FIFO nodes are released, the reconfigured lock-free FIFO can be retired and the memory represented by the released FIFO nodes are released back to the heap.

A Lock-Free FIFO

A conventional FIFO allows for a head FIFO entry to be popped and a tail FIFO entry to be pushed during a single clock cycle. Such a FIFO is adequate for systems in which a single producer fills the FIFO and a single consumer empties the FIFO. When multiple consumers and/or producers simultaneously attempt to access the FIFO only a single consumer and a single producer will succeed. However, a conventional FIFO does not indicate which of the multiple consumers and/or producers accessed the FIFO successfully. Thus, all consumers and/or producers may incorrectly assume that their respective access was successful when, in fact, only a single consumer and producer can access the FIFO successfully during a clock cycle.

Typically, access to a conventional FIFO is controlled using a locking mechanism to ensure that only a single producer and a single consumer can access the FIFO in a single clock cycle. When the FIFO is locked by one consumer, no other consumer may access the FIFO. Similarly, when the FIFO is locked by one producer, no other producer may access the FIFO. Implementation of the locking mechanism is complex. In contrast, multiple producers and/or consumers can attempt to simultaneously access a lock-free FIFO without first obtaining an exclusive lock.

Figure 4B:
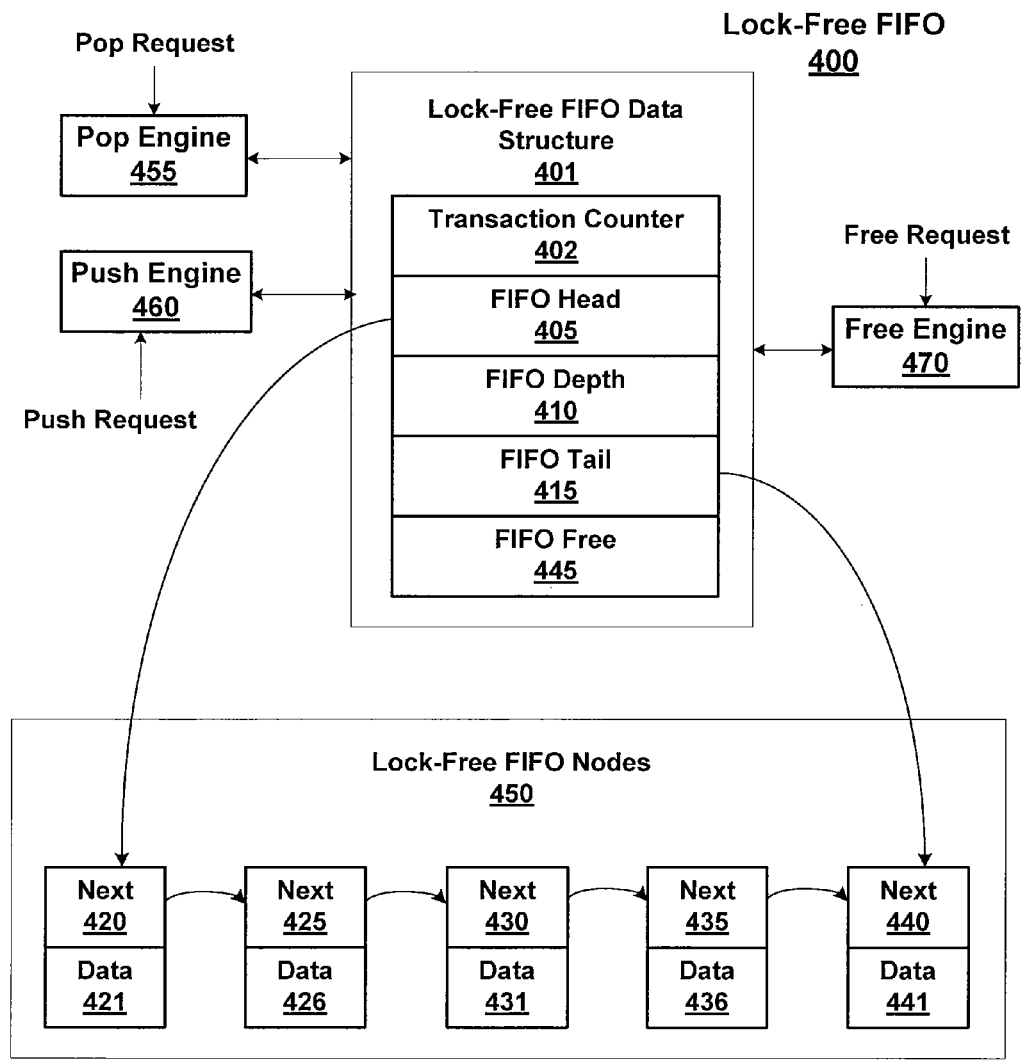
FIG. 4B is a block diagram of a lock-free FIFO, according to one embodiment of the present invention.

FIG. 4B is a block diagram of a lock-free FIFO 400, according to one embodiment of the present invention. The lock-free FIFO 400 includes a lock-free FIFO data structure 401, a pop engine 455, a push engine 460, a free engine 470, and lock-free FIFO nodes 450. The lock-free FIFO nodes 450 is a linked-list of entries within the lock-free FIFO 400, where each entry is a FIFO node that includes a "next" pointer to the next FIFO node in the linked-list and "data". As shown in FIG. 4 the FIFO head node includes next 420 and data 421. Next 420 points to a second FIFO node that includes next 425 and data 426. Next 425 points to a third FIFO node that includes next 430 and data 431. Next 430 points to a fourth FIFO node that includes next 435 and data 436. Next 435 points to the tail FIFO node that includes next 440 and data 441. Although only five nodes are shown in FIG. 4B, fewer or additional nodes may be used. In one embodiment, the number of nodes is limited only by the amount of memory available for storing the lock-free FIFO 450.

The lock-free FIFO data structure 401 stores state information for the lock-free FIFO 400 including a transaction counter 402, a pointer to the FIFO head 405, a pointer to the FIFO tail 415, tracking information FIFO free 445, and a FIFO depth 410. In one embodiment the state information includes one or more other values, such as parameters that are used to determine whether additional FIFO entries should be added to the lock-free FIFO 400.

The pop engine 455 is configured to receive one or more pop requests simultaneously and to pop the head FIFO node from the lock-free FIFO 400 and return a pointer to the popped FIFO node to satisfy one of the pop requests each clock cycle. The pop engine 455 updates the FIFO head 405. For example, when the FIFO head node including next 420 and data 421 is popped, the pop engine 455 updates the FIFO head 405 to point to the new head FIFO node that includes next 425 and data 426. The operations performed by the pop engine 455 are described in conjunction with FIGS. 5A and 5B.

Whenever the head FIFO node is popped from a lock-free FIFO 400, the transaction counter 402 is incremented. The transaction counter is used by atomic compare-and-swap operations that update the FIFO head 405, as described further herein.

The push engine 460 is configured to receive one or more push requests simultaneously and to push a new FIFO node that is received with the push request onto the end of the lock-free FIFO 400. The new FIFO node is added to the linked-list in the lock-free FIFO nodes 450. For example, when the new FIFO node that includes next 440 and data 441 was pushed, the next 435 of the current tail FIFO node is updated to point to the new FIFO node. The push engine 455 then updates the FIFO tail 415 to point to the new tail FIFO node that includes next 440 and data 441. The operations performed by the push engine 460 are described in conjunction with FIG. 6A. The pop engine 455 and the push engine 460 may be implemented in software that is executed by a processing engine or as dedicated circuitry such as a finite-state machine.

As previously described, the lock-free FIFO 400 may be configured as a pop-only lock-free FIFO and the push engine 460 is disabled while the free engine 470 is enabled. The free engine 470 is used when each FIFO node is popped and is not pushed back onto the lock-free FIFO nodes 450. When a FIFO node is no longer needed, i.e., when the memory allocation represented by the FIFO node is freed, the free engine 470 receives a free request. Rather than pushing the FIFO node back onto the lock-free FIFO nodes 450, the free engine 470 keeps track of each freed FIFO node, and determines when all of the FIFO nodes that originally populated the lock-free FIFO nodes 450 have been freed. When all of the FIFO nodes for a particular lock-free FIFO 400 have been freed, the lock-free FIFO 400 may either be recycled or the FIFO nodes may be released to the memory heap 451 from which the FIFO nodes were originally allocated to create the lock-free FIFO 400.

The free engine 470 uses the tracking information stored in the FIFO free 445 to track how many FIFO nodes have been released. The tracking information may include a single bit for each FIFO node that populates the lock-free FIFO 400 and as each FIFO node is released, the specific bit corresponding to the FIFO node is set assuming that the bits are all initialized as cleared when the lock-free FIFO 400 is created (or cleared when the bits are all initialized as set). When all of the bits of the tracking information are either set or cleared, the free engine 470 determines that the lock-free FIFO 400 may be retired.

Each FIFO node is a portion of memory that stores the "next" and "data" values. In one embodiment, when the FIFO nodes are first allocated to the lock-free FIFO 400, the FIFO nodes are in sequential portions of linear memory included in the memory heap 451. While the FIFO nodes are popped in sequential order, the FIFO nodes may be pushed back onto the lock-fee-FIFO 400 in a different order. Therefore, a "next" value must be maintained for each FIFO node in the lock-free FIFO nodes 450.

In one embodiment the "next" values, the FIFO head 405, and the FIFO tail 415 specify a location in memory for a respective FIFO node. In embodiments in which the FIFO nodes are allocated sequentially from linear memory, the "next" values, the FIFO head 405, and the FIFO tail 415 may specify an index that is combined with at least a base location in memory to compute the location in memory for each respective FIFO node.

In one embodiment, new FIFO nodes may be allocated automatically for the lock-free FIFO 400 and the new FIFO nodes may easily be added to the linked list of lock-free FIFO nodes 450 by inserting the new FIFO nodes at the end of the linked list. The tracking information FIFO free 450 should be updated when new FIFO nodes are added to the linked list of lock-free FIFO nodes 450 so that, if the lock-free FIFO 400 is configured as a lock-free pop-only FIFO, the free engine 470 can accurately determine when all of the FIFO nodes of the lock-free FIFO 400 have been released. Parameters stored in the lock-free FIFO data structure 401 may be used to determine whether additional FIFO nodes should be added automatically to the lock-free FIFO 400. For example, a programmable threshold value may be defined and new FIFO nodes may also be added to the linked-list in the lock-free FIFO nodes 450 when the FIFO depth 410 falls below the threshold value. A programmable empty timeout parameter may be defined and included in the lock-free FIFO data structure 401. Additional FIFO nodes may be added to the linked-list in the lock-fee FIFO nodes 450 when the FIFO depth 410 equals zero for a number of clock cycles that is greater than the empty timeout value. Other parameters that may be included in the lock-free FIFO data structure 401 are constants that cannot be modified by a FIFO operation (push or pop), such as a maximum FIFO depth value and a maximum node index value. For embodiments that do not support the addition of new FIFO nodes to the linked list of lock-free FIFO nodes 450, the FIFO depth 410 parameter may be omitted from the lock-free FIFO data structure 401.

In order to allow multiple threads to simultaneously attempt to access the lock-free FIFO 400 without first locking the FIFO for each access, atomic compare-and-swap (CAS) operations are performed by the pop engine 455 and the push engine 460. Using atomic operations ensures that read-modify-write operations performed by a thread to update the FIFO head 405, FIFO tail 415, and to update a "next" value of a FIFO node do not conflict with those performed by any other thread during the same clock cycle. The reliance on atomic operations imposes an upper-bound for the value of the FIFO depth 410. Specifically, N, the number of FIFO nodes in a lock-free FIFO, can be any number so long as it is no larger than the maximum number of bits which may manipulated atomically by the hardware.

Figure 5A:
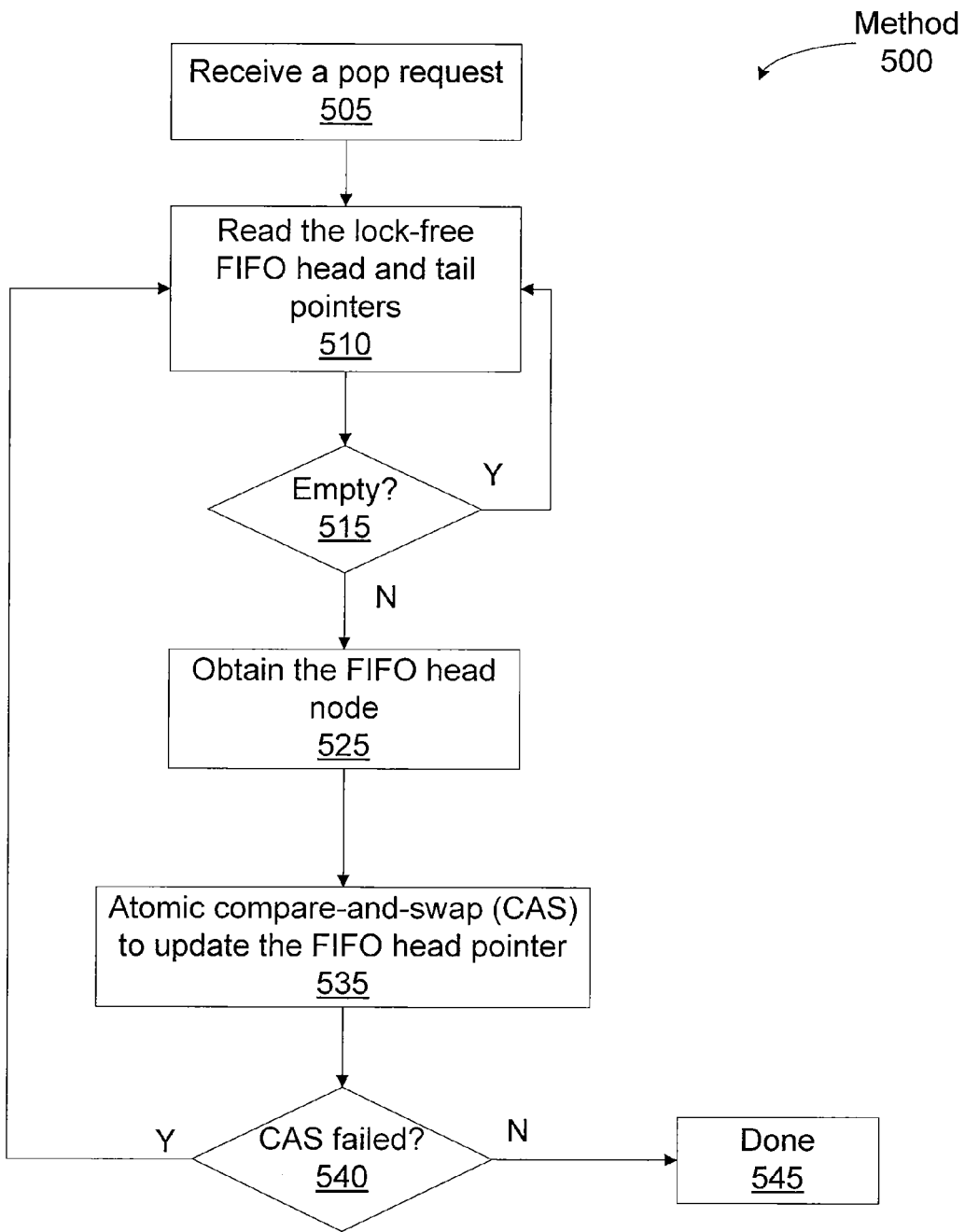
FIG. 5A is a flow diagram of method steps for popping a FIFO head node from a lock-free FIFO, according to one embodiment of the present invention.

FIG. 5A is a flow diagram of method steps for popping a FIFO node from the lock-free FIFO 400, according to one embodiment of the present invention. Although the method steps are described in conjunction with the systems of FIGS. 1, 2, 3A, 3B, 3C, 4A, and 4B, persons skilled in the art will understand that any system configured to perform the method steps, in any order, is within the scope of the invention.

The method 500 shown in FIG. 5A is performed by the pop engine 455 for each pop request to pop the FIFO head node from the lock-free FIFO 400. The method 500 is performed for each pop request when pop requests are simultaneously received from different threads. Therefore, the method 500 may be performed simultaneously for multiple pop requests. However, a given FIFO head node is provided to only one thread of the different threads to satisfy the pop request presented by the one thread.

At step 505 a pop request is received from a thread. At step 510 the pop engine 455 reads the FIFO head 405 and the FIFO tail 415. The pop engine 455 may also read the transaction count 401. At step 515 the pop engine 455 determines if the FIFO head 405 equals the FIFO tail 415, indicating that the lock-free FIFO 400 is empty, i.e., the same FIFO node is both the head FIFO node and the tail FIFO node. Alternatively, the FIFO depth 410 may be used to determine if the lock-free FIFO 400 is empty.

If, at step 515 the pop engine 455 determines that the lock-free FIFO 400 is empty, then steps 510 and 515 are repeated. In one embodiment, when a pop operation is attempted and the lock-free FIFO 400 is empty a failure is indicated after a predetermined number of failed pop operations and/or after a timeout has expired. Otherwise, at step 525 the pop engine 455 obtains the FIFO head node. More specifically, the pop engine 455 may read the data for the FIFO head node so that the data can be provided to the thread that successfully pops the FIFO head node. Alternatively, the pop engine 455 may provide the index of the FIFO head node to the thread that successfully pops the FIFO head node.

At step 535 the pop engine 455 performs an atomic CAS operation that compares the FIFO head value read at step 510 with the current FIFO head 505 and replaces the current FIFO head 505 with the "next" value of the current FIFO head node (the same FIFO head node that is popped). For example, if the FIFO head node 405 points to the FIFO node including next 420 and data 421, then popping the head FIFO node will update the FIFO head node 405 to point to the FIFO node including next 425 and data 426. Importantly, because multiple threads may be attempting to pop the FIFO head node at the same time, updating the FIFO head 405 must be performed atomically. The atomic CAS operation to update the FIFO head 405 is performed for each thread presenting a pop request to the pop engine 455. The CAS operation succeeds for only one thread and fails for any other threads attempting to simultaneously pop the FIFO head node. The FIFO depth 410 and the transaction counter 402 are also updated at the same time and using the same atomic CAS operation that updates the FIFO head 405. If the atomic CAS operation is limited to a maximum number of bits, e.g., 32, 64, or 128, then the combined number of bits that represent the FIFO head 405, FIFO depth 410, transaction counter 402, and the FIFO tail 415 should not exceed the maximum number of bits.

If, at step 540 the pop engine 455 determines that the CAS operation failed for the pop request, then the pop engine 455 returns to step 510 to retry the pop request. If, at step 540 the pop engine 455 determines that the CAS operation did not fail for the pop request, then at step 545 the pop request is satisfied and the processing of the pop request is done.

Figure 5B:
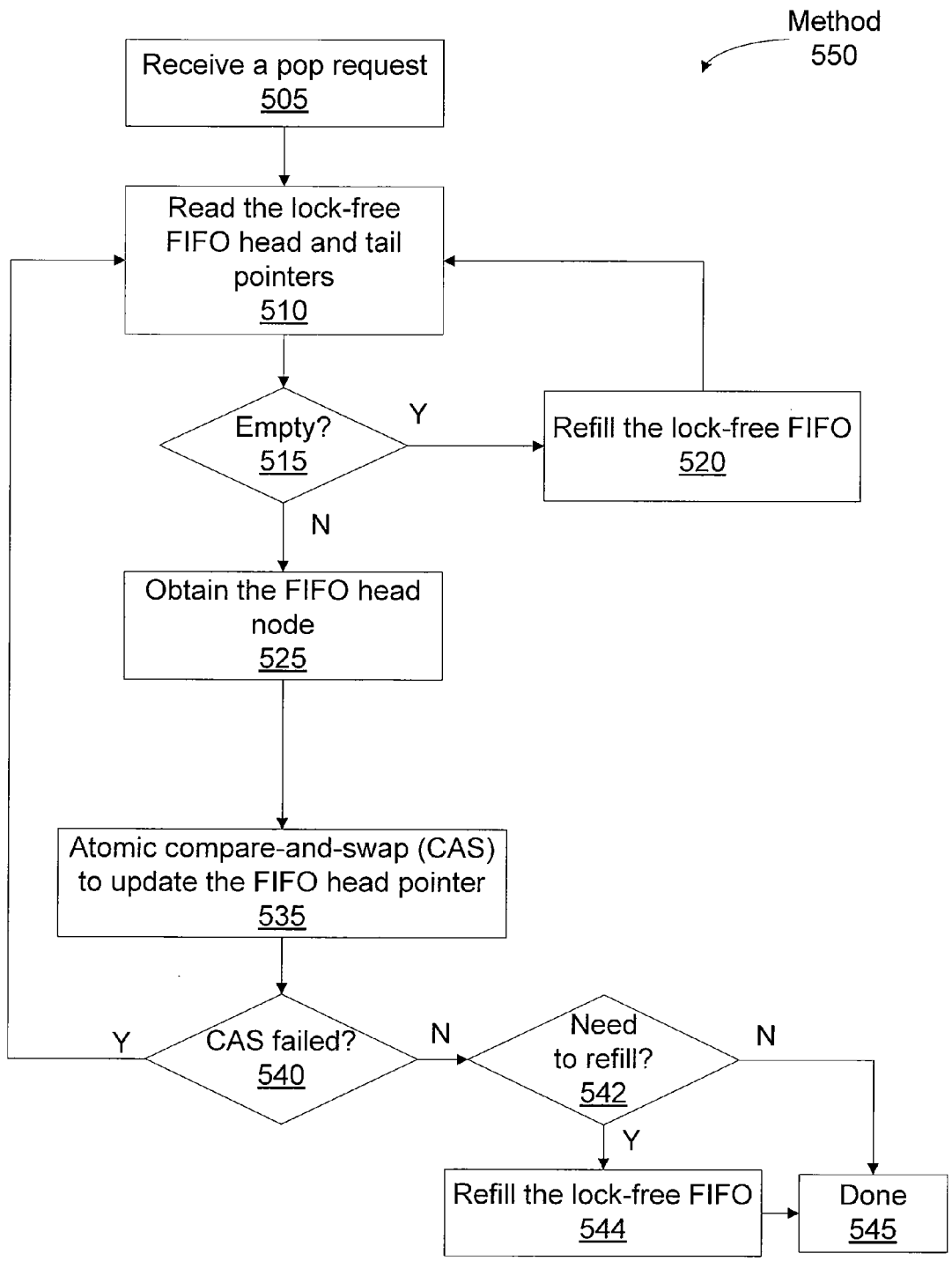
FIG. 5B is another flow diagram of method steps for popping the head FIFO node from the lock-free FIFO, according to one embodiment of the present invention.

FIG. 5B is another flow diagram of method steps for popping the head FIFO node from the lock-free FIFO 400, according to one embodiment of the present invention. Method 550 includes steps 505, 510, 515, 525, 535, 540, and 545 from method 500. Steps 505, 510, and 515 are performed as previously described in conjunction with FIG. 5A. If, at step 515 the pop engine 455 determines that the lock-free FIFO 400 is empty, then at step 520 the pop engine 455 refills the lock-free FIFO 400 by adding new FIFO nodes to tail of the lock-free FIFO nodes 450 before returning to step 510. The tracking information FIFO free 445 is updated to enable tracking of the new FIFO nodes. If, at step 515 the pop engine 455 determines that the lock-free FIFO 400 is not empty, then the pop engine 455 proceeds to step 525.

Steps 525, 535, and 540 are completed as previously described in conjunction with FIG. 5A. If, at step 540 the pop engine 455 determines that the CAS operation failed for the pop request, then at step 542 the pop engine 455 determines if the FIFO needs to be refilled. The parameters stored in the lock-free FIFO data structure 401 may be used to determine whether new FIFO nodes should be added to the linked list in the lock-free FIFO nodes 450. In one embodiment, the pop engine 455 determines that the lock-free FIFO 400 needs to be refilled when the lock-free FIFO 400 is empty. If, at step 542 the pop engine 455 determines that the lock-free FIFO 400 does not need to be refilled, then at step 545 the processing of the pop request is done. Otherwise, at step 544 the pop engine 455 adds new FIFO nodes to the linked list before proceeding to step 545. The tracking information FIFO free 445 is updated to enable tracking of the new FIFO nodes. When a thread is in the process of adding new FIFO nodes to the linked list, a flag is set to prevent other threads from also trying to add new FIFO nodes at the same time. Only a single thread needs to add the new FIFO nodes to prevent the lock-free FIFO 400 from being empty.

Although method 550 illustrates two different steps (520 and 544) that add new FIFO nodes to the linked list, other embodiments may include only one of steps 520 and 544. For example, an embodiment that is configured to refill the lock-free FIFO 400 when the lock-free FIFO 400 is empty may include step 520. Another embodiment that is configured to refill the lock-free FIFO 400 based on the FIFO depth 410 reaching a threshold value may include step 544.

Pushing FIFO nodes back on to the lock-free FIFO 400 has more steps than popping FIFO nodes from the lock-free FIFO 400. Therefore, one embodiment may configure all of the lock-free FIFOs as lock-free pop-only FIFOs and the push engine 460 may be omitted. When a FIFO node is popped only the FIFO head 405 and the FIFO depth 410 needs to be updated. When a FIFO node is pushed the FIFO tail 415, FIFO depth 410, and the next value in the FIFO node that is no longer the FIFO tail node needs to be updated. Two CAS operations are performed, a first CAS to update the next value and a second CAS to update the FIFO tail 415 and FIFO depth 410. The ordering of these CAS operations is important—by updating the next value in the current FIFO tail node of the lock-free FIFO nodes 450 before the FIFO tail 415 is updated, it is possible to ensure exclusive access by only one thread when updating the FIFO tail pointer 415. Once the FIFO tail 415 is updated, the new FIFO tail node may be read by another thread to perform another push operation or another pop operation (to check for the lock-free FIFO being empty). Therefore, it is important that the FIFO tail 415 is accurate.

Another complication for the push operation is due to the fact that FIFO nodes may be popped and pushed simultaneously and a FIFO node having a particular index may actually be popped by a first thread and then pushed back onto the lock-free FIFO 400 while a second thread attempts to pop the FIFO node. This is a classic ABA problem in which the second thread uses the "next" value of the FIFO node when the FIFO node was first popped instead of using the "next" value of the FIFO node after the FIFO node is pushed back onto the lock-free FIFO 400. The second thread does not distinguish between the particular FIFO node having two different "next" values because the index of the FIFO node is unchanged.

To avoid the ABA problem, the index may be set to a different value when a FIFO node is pushed onto the lock-free FIFO 400. For example, when a FIFO node is pushed onto the lock-free FIFO 400 the index for the FIFO node is updated such that the index=old index+maximum FIFO depth. The maximum FIFO depth is the total number of FIFO nodes when all allowable FIFO nodes are pushed onto the lock-free FIFO nodes 450. Detection of rollover of the computed index is necessary to ensure that the FIFO nodes are uniquely identified. The maximum FIFO depth may be stored as a parameter in the lock-free FIFO data structure 401. Importantly, the maximum FIFO depth should never change over the lifetime of the FIFO. Otherwise, the maximum FIFO depth cannot be used to compute the physical location of a FIFO node based on the index associated with the FIFO node. The location of the FIFO node in memory may then be computed as base location+index % maximum FIFO depth (where % is the modulo operator), assuming that index rollover is detected or avoided.

The ABA problem may also be avoided by using the transaction counter 402 as an input for the atomic CAS operations. Because the transaction counter 402 is incremented for each pop operation it uniquely identifies the FIFO nodes, assuming that rollover is detected or avoided.

Figure 6A:
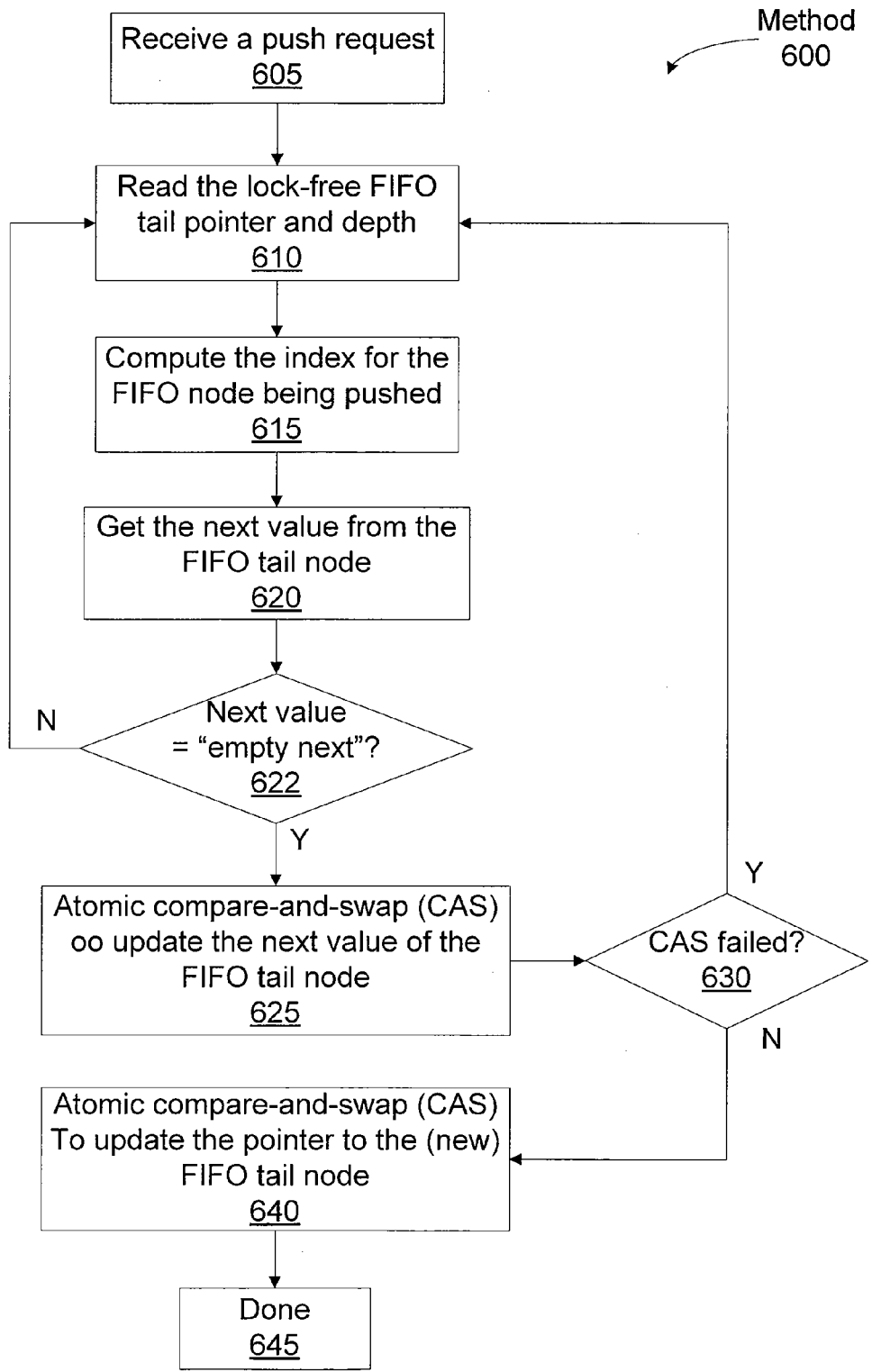
FIG. 6A is a flow diagram of method steps for pushing a FIFO node onto a lock-free FIFO, according to one embodiment of the present invention.

FIG. 6A is a flow diagram of method steps for pushing a FIFO node onto the lock-free FIFO 400, according to one embodiment of the present invention. Note that, when a lock-free FIFO 400 is configured as a lock-free pop-only FIFO, then free requests are received by the memory allocation engine 480 instead of push requests. Although the method steps are described in conjunction with the systems of FIGS. 1, 2, 3A, 3B, 3C, 4A, and 4B, persons skilled in the art will understand that any system configured to perform the method steps, in any order, is within the scope of the invention.

The method 600 shown in FIG. 6A is performed by the push engine 460 for each push request to push a new FIFO tail node onto the lock-free FIFO 400. The method 600 is performed for each push request when push requests are simultaneously received from different threads. Therefore, the method 600 may be performed simultaneously for multiple push requests. However, the FIFO tail 415 is updated by only one thread of the different threads to satisfy the push request presented by the one thread.

At step 605 a push request is received from a thread. At step 610 the push engine 460 reads the FIFO tail 415 and the FIFO depth 410. At step 615 the push engine 460 computes a new index for the FIFO node to be pushed onto the lock-free FIFO 400. In one embodiment, the new index for the FIFO node to be pushed onto the lock-free FIFO 400 is the old index increased by a maximum FIFO depth. The maximum FIFO depth is the total number of FIFO nodes when all of the FIFO nodes are pushed onto the lock-free FIFO nodes 450. The maximum FIFO depth may be stored as a parameter in the lock-free FIFO data structure 401. Importantly, when new FIFO nodes are added to the lock-free FIFO nodes 450 (during steps 520 and 544 of FIG. 5B) the maximum FIFO depth should be updated.

At step 620 the push engine 460 reads the "next" value for the current FIFO tail node. Because the current FIFO tail node does not point to another FIFO node the "next" value is a unique "empty next" indicator, e.g., "NULL" if a pointer or "−1" if an index, that does not equal any of the possible index values. At step 622 the push engine 460 determines if the "next" value for the current FIFO tail node equals the "empty next" indicator, and, if not, then another thread already has a push transaction in progress and the push engine 460 returns to step 610 to read the new FIFO tail 415.

At step 622 if the push engine 460 determines if the "next" value for the current FIFO tail node equals the "empty next" indicator, then at step 625 the push engine 460 performs an atomic CAS operation that compares the "next" value read at step 620 with the current "next" value of the FIFO tail node and replaces (or exchanges) the current "next" value of the FIFO tail node with the computed index of the FIFO node being pushed. For example, when the FIFO node including next 440 and data 441 is being pushed, the index of the node containing next 440 replaces the next 435 of the current FIFO tail node.

If, at step 630 the push engine 460 determines that the first CAS operation failed to update the "next" value of the current FIFO tail node, then the push engine 460 returns to step 610 to retry the push request. Importantly, because multiple threads may be attempting to update the next value of the current FIFO tail node at the same time, updating the next value must be performed atomically. The atomic CAS operation to update the next value of the current FIFO tail node is performed for each thread presenting a push request to the push engine 460. The CAS operation succeeds for only one thread and fails for any other threads attempting to simultaneously update the next value of the current FIFO tail node when pushing a FIFO node that will become the FIFO tail node.

Note that when the "next" value of the FIFO tail node is replaced at step 625, but the FIFO tail 415 not yet updated to point to the new FIFO tail node, no thread other than the thread that successfully performed the CAS operation in step 625 can progress past step 630. Only the thread that successfully replaces the "next" value of the FIFO tail node in step 625 will be permitted to update the FIFO tail 415 (in step 640). Consequently, in one embodiment, a thread that fails step 622 may instead read the FIFO tail 415 and only return to step 610 when the value of the FIFO tail 415 changes rather than returning to step 610 immediately after step 622.

If, at step 630 the push engine 460 determines that the first CAS operation did not fail, then at step 640 the push engine 460 performs a second atomic CAS operation that compares the FIFO tail 415 read at step 610 with the current FIFO tail 415 and replaces the current FIFO tail 415 with the computed index of the FIFO node being pushed. The second atomic CAS operation may also update the FIFO depth 410. When a pop occurs simultaneously with the push operation the FIFO head 405 and transaction counter 402 are also updated by the second atomic CAS operation. At step 645 the push request is satisfied and the processing of the push request is done.

Figure 6B:
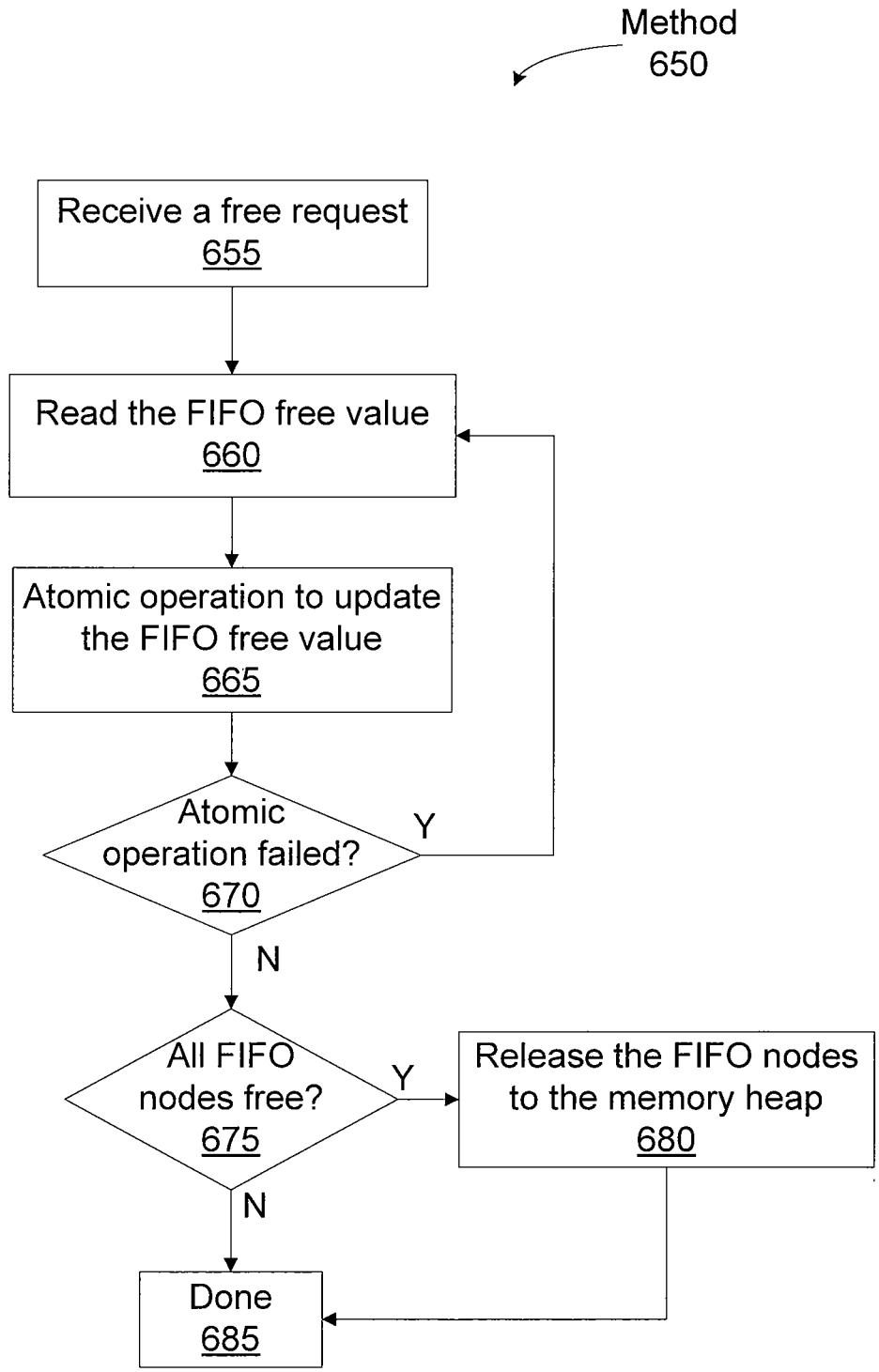
FIG. 6B is a flow diagram of method steps for processing a free request to free a FIFO node of a lock-free FIFO, according to one embodiment of the present invention.

FIG. 6B is a flow diagram of method steps for processing a free request to free a FIFO node of a lock-free pop-only FIFO, according to one embodiment of the present invention. Although the method steps are described in conjunction with the systems of FIGS. 1, 2, 3A, 3B, 3C, 4A, and 4B, persons skilled in the art will understand that any system configured to perform the method steps, in any order, is within the scope of the invention.

The method 650 shown in FIG. 6B is performed by the free engine 470 for each free request to update the tracking information FIFO free 445, and, if possible, retire the lock-free FIFO 400 configured as a lock-free pop-only FIFO and release the FIFO nodes back to the memory heap 451. The method 650 is performed for each free request when free requests are simultaneously received from different threads. Therefore, the method 650 may be performed simultaneously for multiple free requests.

At step 655 a free request is received from a thread and the free engine 470 identifies the lock-free FIFO 400 from which the FIFO node was popped. At step 660 the push engine 460 reads the FIFO free 445. At step 665 the free engine 470 performs an atomic CAS operation that compares the free value read at step 660 with the current value of FIFO free 445 and replaces the current value of FIFO free 445 with an updated free value. In one embodiment, the tracking information is initialized as a count of the number of FIFO nodes used to populate the lock-free pop-only FIFO 400 and the count is decremented by the atomic operation. When the count equals zero, the lock-free FIFO 400 configured as a lock-free pop-only FIFO may be retired. When the tracking information includes a bit corresponding to each FIFO node, a bit-wise OR atomic operation may be performed to set or clear the bit corresponding to the FIFO node being freed (the index of the FIFO node may be used to identify the bit to be updated).

If, at step 670 the free engine 470 determines that the atomic operation failed to update the value of FIFO free 445, then the free engine 470 returns to step 660 to retry the free request. Importantly, because multiple threads may be attempting to update the value of FIFO free 445 at the same time, updating the value of FIFO free 445 must be performed atomically.

At step 675 the free engine 470 determines if all of the FIFO nodes that populate the lock-free FIFO 400 configured as a lock-free pop-only FIFO have been freed and, if not, at step 685 the free engine 470 has completed processing of the free request. Otherwise, at step 680, the free engine 680 retires the FIFO nodes of the lock-free FIFO 400 and signals the memory allocation engine 480 that the freed FIFO nodes may be released to the memory heap 451. At step 685 the free engine 470 has completed processing of the free request.

Figure 7A:
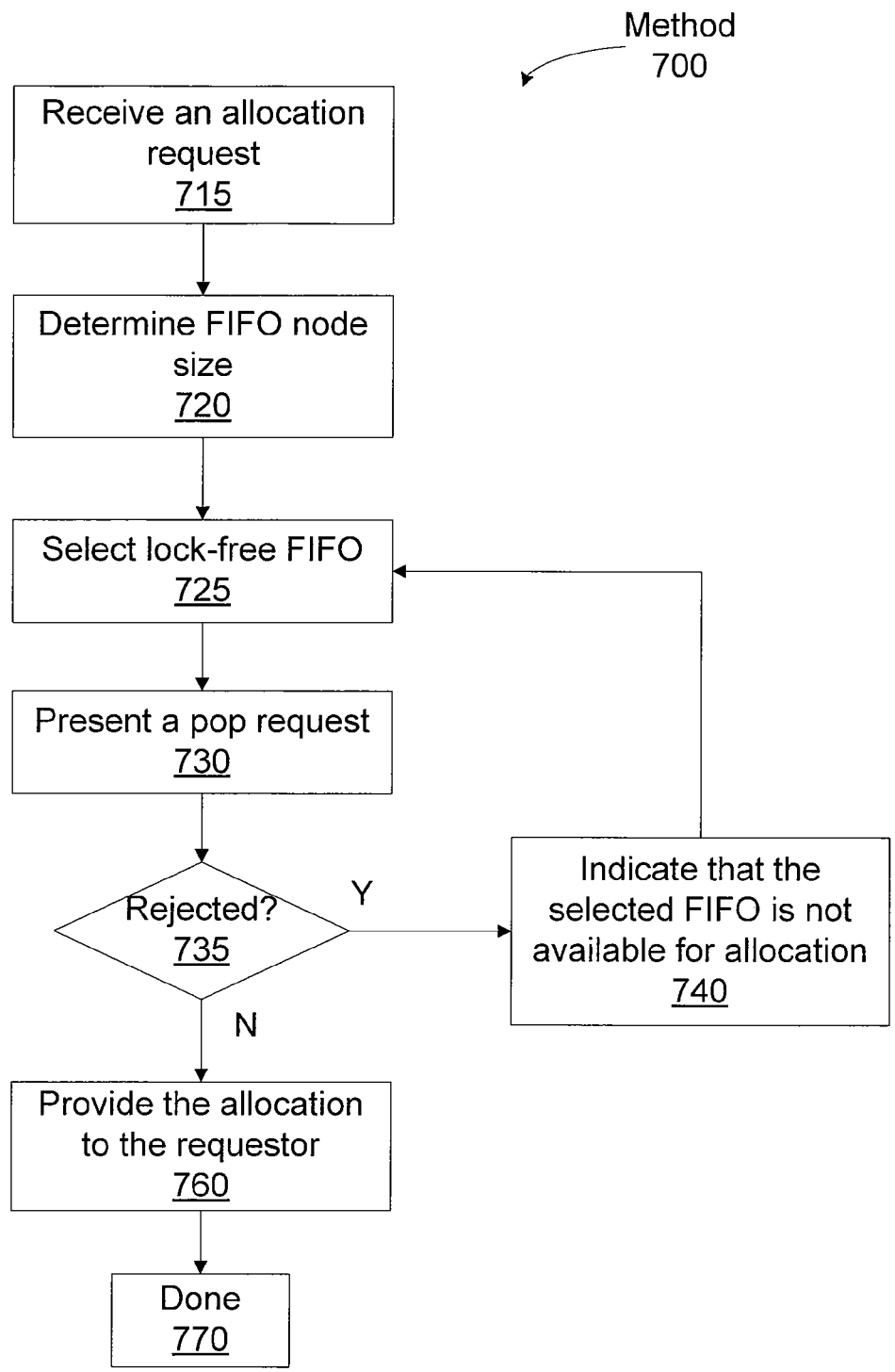
FIG. 7A is a flow diagram of method steps for allocating memory using one or more lock-free FIFOs, according to one embodiment of the present invention.

FIG. 7A is a flow diagram of method steps for allocating memory using one or more lock-free FIFOs 400, according to one embodiment of the present invention. Although the method steps are described in conjunction with the systems of FIGS. 1, 2, 3A, 3B, 3C, 4A, and 4B, persons skilled in the art will understand that any system configured to perform the method steps, in any order, is within the scope of the invention.

The method 700 shown in FIG. 7A is performed by the memory allocation engine 480 for each allocation request. The method 700 is performed for each allocation request when allocation requests are simultaneously received from different threads. Therefore, the method 700 may be performed simultaneously for multiple allocation requests.

At step 715 the memory allocation engine 480 receives an allocation request from a thread. At step 720 the memory allocation engine 480 determines the size of the FIFO node that is needed to satisfy the allocation request. At step 725 the memory allocation engine 480 selects a lock-free FIFO that is populated with the needed size of FIFO nodes. At step 730 the memory allocation engine 480 presents a pop request to the selected lock-free FIFO 400. At step 735 the memory allocation engine 480 determines if the pop request is rejected by the selected lock-free FIFO 400.

The pop request may be rejected if the lock-free FIFO 400 is empty and is either not refilled or is a lock-free FIFO that is configured as a lock-free pop-only FIFO. If, the pop request is rejected, then at step 740 the memory allocation engine 480 indicates that the selected lock-free FIFO 400 is not available for allocations before returning to step 725. If new FIFO nodes are added to the unavailable lock-free FIFO 400 at a later time, the memory allocation engine 480 may indicate that the lock-free FIFO 400 is available for allocations.

If, at step 735, the memory allocation engine 480 determines that the pop request was not rejected, then the memory allocation engine 480 proceeds directly to step 760. At step 760 the memory allocation engine 480 provides the popped FIFO node, e.g., memory allocation, to the requestor. At step 770 the memory allocation request is satisfied and the memory allocation engine 480 is done processing the allocation request.

Figure 7B:
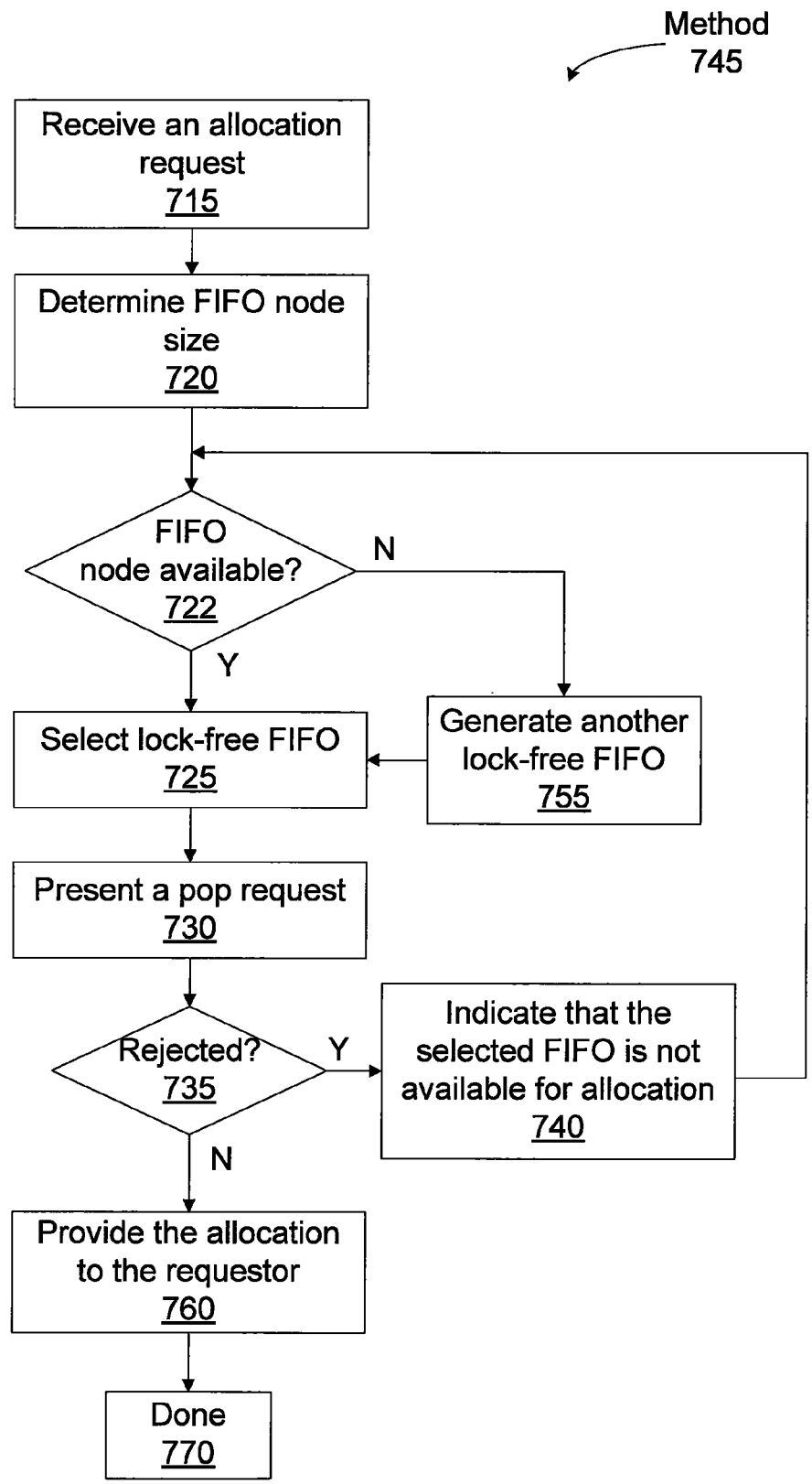
FIG. 7B is another flow diagram of method steps for allocating memory using one or more lock-free FIFOs, according to one embodiment of the present invention.

FIG. 7B is another flow diagram of method steps for allocating memory using one or more lock-free FIFOs 400, according to one embodiment of the present invention. Method 745 includes steps 715, 720, 725, 730, 735, 740, 760, 765, and 770 from method 700. Steps 715, 720, 725, 730, 735, 740, 760, 765, and 770 are performed as previously described in conjunction with FIG. 7A. Following step 720, at step 722 the memory allocation engine 480 determines if another FIFO node is available to satisfy the allocation request. If another FIFO node is available to satisfy the allocation request, then the memory allocation engine 480 proceeds to step 725 to select the lock-free FIFO 400. Otherwise, at step 755 the memory allocation engine 480 generates another lock-free FIFO 400 and populates the new lock-free FIFO 400 with FIFO nodes sized to satisfy the allocation request. The memory allocation engine 480 then proceeds to step 730 to present a pop request to the new lock-free FIFO 400. Alternatively, the memory allocation engine 480 may proceed to step 725 after step 755.

Using multiple lock-free FIFOs to allocate memory enables efficient allocation of memory space for one or more threads simultaneously based on the amount of the memory requested. When a lock-free FIFO is available for the allocation, the allocation is performed. Otherwise, one or more new lock-free FIFOs may be created and populated to perform the allocation. The allocation is performed using an atomic operation that pops a FIFO node representing a portion of the memory space to ensure that each portion of the memory is only allocated to a single one of the multiple threads.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

The invention claimed is:

1. A method of allocating memory, the method comprising:
   receiving a first memory allocation request specifying a first amount of memory;
   receiving a second memory allocation request simultaneously with the first memory allocation request, wherein the second memory allocation request specifies the first amount of memory;
   identifying a first-in first-out buffer (FIFO) node size included in a plurality of different FIFO node sizes based on the first amount of memory;
   selecting a first FIFO and a second FIFO based on the FIFO node size, wherein the first FIFO and the second FIFO are each populated with FIFO nodes of the FIFO node size, and at least one of the first FIFO and the second FIFO comprises a lock-free pop-only FIFO;
   determining that a first compare-and-swap (CAS) operation succeeded, wherein the first CAS operation swaps a first FIFO head value associated with the first FIFO with a next value of a FIFO node included in the first FIFO;
   in response to determining that the first CAS operation succeeded, popping a first FIFO head node associated with the first FIFO head value from the first FIFO to satisfy the first memory allocation request;
   determining that a second CAS operation succeeded, wherein the second CAS operation swaps a second FIFO head value associated with the second FIFO with a next value of a FIFO node included in the second FIFO; and
   in response to determining that the second CAS operation succeeded, popping a second FIFO head node associated with the second FIFO head value from the second FIFO, simultaneously with the popping of the first FIFO head node, to satisfy the second memory allocation request.

2. The method of claim 1, further comprising receiving a first allocation free request to free a portion of memory represented by the first FIFO head node.

3. The method of claim 2, further comprising updating tracking information associated with the first FIFO to indicate that the first FIFO head node is freed.

4. The method of claim 3, wherein the tracking information is updated using an atomic operation.

5. The method of claim 2, further comprising:
receiving additional allocation free requests to free additional portions of memory represented by additional FIFO nodes popped from the first FIFO;
determining that all FIFO nodes popped from the first FIFO are freed;
retiring the first FIFO; and
releasing a quantity of memory corresponding to the FIFO nodes populating the first FIFO.

6. The method of claim 1, further comprising receiving a first allocation push request for a portion of memory represented by the second FIFO head node.

7. The method of claim 6, further comprising pushing the second FIFO head node onto the second FIFO as a new FIFO tail node.

8. The method of claim 7, further comprising:
changing a configuration of the second FIFO from a lock-free FIFO to a lock-free pop-only FIFO;
receiving an allocation free request to free a portion of memory represented by a FIFO node popped from the second FIFO; and
updating tracking information associated with the second FIFO to indicate that the FIFO node is freed.

9. The method of claim 1, further comprising:
creating the first FIFO;
populating the first FIFO with the FIFO nodes of the FIFO node size, wherein the FIFO nodes are configured in a linked list and each FIFO node includes a next value that indicates a next FIFO node in the linked list; and
initializing tracking information associated with the first FIFO indicating a quantity of FIFO nodes that populate the first FIFO.

10. The method of claim 1, wherein the first FIFO and the second FIFO are selected from a plurality of FIFOs, each FIFO included in the plurality of FIFOs is populated with FIFO nodes of a single FIFO node size, and the plurality of FIFOs includes FIFO nodes of at least two different FIFO node sizes.

11. The method of claim 1, further comprising changing a configuration of the second FIFO from a lock-free FIFO to a lock-free push-only FIFO.

12. A parallel processing unit, comprising:
a memory heap;
a first first-in first-out buffer (FIFO) that is populated with a first quantity of FIFO nodes that each represent a portion of memory from the memory heap;
a second FIFO that is populated with a second quantity of FIFO nodes that each represent the portion of memory from the memory heap; and
a memory allocation engine that is configured to:
receive a first memory allocation request specifying a first amount of memory;
receive a second memory allocation request simultaneously with the first memory allocation request, wherein the second memory allocation request specifies the first amount of memory;
identify a first-in first-out buffer (FIFO) node size included in a plurality of different FIFO node sizes based on the first amount of memory;
select the first FIFO and the second FIFO based on the FIFO node size, wherein the first FIFO and the second FIFO are each populated with FIFO nodes of the FIFO node size, and at least one of the first FIFO and the second FIFO comprises a lock-free pop-only FIFO;
determine that a first compare-and-swap (CAS) operation succeeded, wherein the first CAS operation swaps a first FIFO head value associated with the first FIFO with a next value of a FIFO node included in the first FIFO;
in response to determining that the first CAS operation succeeded, pop a first FIFO head node associated with the first FIFO head value from the first FIFO to satisfy the first memory allocation request;
determine that a second CAS operation succeeded, wherein the second CAS operation swaps a second FIFO head value associated with the second FIFO with a next value of a FIFO node included in the second FIFO; and
in response to determining that the second CAS operation succeeded, pop a second FIFO head node associated with the second FIFO head value from the second FIFO, simultaneously with the popping of the first FIFO head node, to satisfy the second memory allocation request.

13. The parallel processing unit of claim 12, wherein the memory allocation unit is further configured to receive a first allocation free request to free a portion of memory represented by the first FIFO head node.

14. The parallel processing unit of claim 13, wherein the memory allocation unit is further configured to update tracking information associated with the first FIFO to indicate that the first FIFO head node is freed.

15. The parallel processing unit of claim 13, wherein the memory allocation unit is further configured to:
receive additional allocation free requests to free additional portions of memory represented by additional FIFO nodes popped from the first FIFO;
determine that all FIFO nodes popped from the first FIFO are freed;
retire the first FIFO; and
release a quantity of memory corresponding to the FIFO nodes populating the first FIFO.

16. The parallel processing unit of claim 12, wherein the memory allocation unit is further configured to receive a first allocation push request for a portion of memory represented by the second FIFO head node.

17. The parallel processing unit of claim 16, wherein the memory allocation unit is further configured to push the second FIFO head node onto the second FIFO as a new FIFO tail node.

18. The parallel processing unit of claim 17, wherein the memory allocation unit is further configured to:
change a configuration of the second FIFO from a lock-free FIFO to a lock-free pop-only FIFO;
receive an allocation free request to free a portion of memory represented by a FIFO node popped from the second FIFO; and
update tracking information associated with the second FIFO to indicate that the FIFO node is freed.

19. A non-transitory computer-readable storage medium storing instructions that, when executed by a processor, cause the processor to allocate memory, by performing the steps of:
receiving a first memory allocation request specifying a first amount of memory;

receiving a second memory allocation request simultaneously with the first memory allocation request, wherein the second memory allocation request specifies the first amount of memory;

identifying a first-in first-out buffer (FIFO) node size included in a plurality of different FIFO node sizes based on the first amount of memory;

selecting a first FIFO and a second FIFO based on the FIFO node size, wherein the first FIFO and the second FIFO are each populated with FIFO nodes of the FIFO node size, and at least one of the first FIFO and the second FIFO comprises a lock-free pop-only FIFO;

determining that a first compare-and-swap (CAS) operation succeeded, wherein the first CAS operation swaps a first FIFO head value associated with the first FIFO with a next value of a FIFO node included in the first FIFO;

in response to determining that the first CAS operation succeeded, popping a first FIFO head node associated with the first FIFO head value from the first FIFO to satisfy the first memory allocation request;

determining that a second CAS operation succeeded, wherein the second CAS operation swaps a second FIFO head value associated with the second FIFO with a next value of a FIFO node included in the second FIFO; and in response to determining that the second CAS operation succeeded, popping a second FIFO head node associated with the second FIFO head value from the second FIFO, simultaneously with the popping of the first FIFO head node, to satisfy the second memory allocation request.

20. The non-transitory computer-readable storage medium of claim 19, further comprising receiving a first allocation free request to free a portion of memory represented by the first FIFO head node.

21. The non-transitory computer-readable storage medium of claim 20, further comprising updating tracking information associated with the first FIFO to indicate that the first FIFO head node is freed.

22. The non-transitory computer-readable storage medium of claim 21, wherein the tracking information is updated using an atomic operation.

23. The non-transitory computer-readable storage medium of claim 20, further comprising:

receiving additional allocation free requests to free additional portions of memory represented by additional FIFO nodes popped from the first FIFO;

determining that all FIFO nodes popped from the first FIFO are freed;

retiring the first FIFO; and releasing a quantity of memory corresponding to the FIFO nodes populating the first FIFO.

24. The non-transitory computer-readable storage medium of claim 19, wherein the first FIFO is configured as a lock-free pop-only FIFO and the second FIFO is configured as a lock-free FIFO.

25. The non-transitory computer-readable storage medium of claim 19, further comprising receiving a first allocation push request for a portion of memory represented by the second FIFO head node.

26. The non-transitory computer-readable storage medium of claim 25, further comprising pushing the second FIFO head node onto the second FIFO as a new FIFO tail node.

27. The non-transitory computer-readable storage medium of claim 26, further comprising:

changing a configuration of the second FIFO from a lock-free FIFO to a lock-free pop-only FIFO;

receiving an allocation free request to free a portion of memory represented by a FIFO node popped from the second FIFO; and updating tracking information associated with the second FIFO to indicate that the FIFO node is freed.

28. A method of allocating memory, the method comprising:

receiving a first memory allocation request specifying a first amount of memory;

receiving a second memory allocation request simultaneously with the first memory allocation request, wherein the second memory allocation request specifies the first amount of memory;

identifying a first-in first-out buffer (FIFO) node size based on the first amount of memory;

selecting a first FIFO and a second FIFO that are each populated with FIFO nodes of the FIFO node size, wherein the first FIFO is configured as a lock-free pop-only FIFO, and wherein the second FIFO is configured as a lock-free FIFO;

popping a first FIFO head node from the first FIFO to satisfy the first memory allocation request; and popping a second FIFO head node from the second FIFO, simultaneously with the popping of the first FIFO head node, to satisfy the second memory allocation request.

* * * * *